(12) United States Patent
Ishigame et al.

(10) Patent No.: US 8,327,665 B2
(45) Date of Patent: Dec. 11, 2012

(54) ONE-PRESS METHOD FOR PRODUCING GLASS VESSEL

(75) Inventors: Juji Ishigame, Tokyo (JP); Takenori Yamanaka, Chiba (JP); Daisuke Date, Chiba (JP)

(73) Assignee: KOA Glass Co., Ltd., Tokyo (JP)

( * ) Notice: Subject to any disclaimer, the term of this patent is extended or adjusted under 35 U.S.C. 154(b) by 287 days.

(21) Appl. No.: 12/733,245

(22) PCT Filed: May 12, 2009

(86) PCT No.: PCT/JP2009/058805
§ 371 (c)(1),
(2), (4) Date: Feb. 19, 2010

(87) PCT Pub. No.: WO2010/016308
PCT Pub. Date: Feb. 11, 2010

(65) Prior Publication Data
US 2010/0147029 A1  Jun. 17, 2010

(30) Foreign Application Priority Data
Aug. 7, 2008  (JP) ................................. 2008-203744

(51) Int. Cl.
*C03B 11/00* (2006.01)
*C03B 11/10* (2006.01)

(52) U.S. Cl. .............................................. 65/82; 65/66

(58) Field of Classification Search ................ 65/68, 82, 65/267
See application file for complete search history.

(56) References Cited

U.S. PATENT DOCUMENTS

| | | | |
|---|---|---|---|
| 3,337,321 A * | 8/1967 | Teague, Jr. et al. ............ | 65/30.1 |
| 3,914,120 A * | 10/1975 | Foster ............................... | 65/229 |
| 4,824,460 A * | 4/1989 | Fenton ............................... | 65/68 |
| 2003/0029200 A1 * | 2/2003 | Mace ............................... | 65/356 |
| 2005/0118367 A1 * | 6/2005 | Gantenbrink ................. | 428/34.4 |

FOREIGN PATENT DOCUMENTS

| | | |
|---|---|---|
| HU | 200140 B | 4/1990 |
| JP | 2000-211930 A | 8/2000 |
| JP | 2001-294434 A | 10/2001 |
| JP | 2004-155646 | 6/2004 |
| JP | 2007-31197 A | 2/2007 |

* cited by examiner

OTHER PUBLICATIONS

A. Ya. Kasman, "Wall thickness determination for glass holloware in annealing calculations", Glass and Ceramics, vol. 48, No. 8, (1991), pp. 345-347.*

*Primary Examiner* — Matthew Daniels
*Assistant Examiner* — Cynthia Szewczyk
(74) *Attorney, Agent, or Firm* — Carmody & Torrance LLP

(57) ABSTRACT

There is provided a one-press method for producing a glass vessel, the method enabling efficient production of even a glass vessel having the maximum thick wall part having a thickness larger than a predetermined value by using a divided type forming mold having a specific parting line. The one-press method for producing a glass vessel, the method including (A) a press step of molding, by one press, a parison having a finish form from the gob by using a forming die including a forming die base part and a mouth die which are each divided into two parts by a predetermined parting line, (B) a transfer step of transferring the parison having a finish form to a cooling mold, and (C) a cooling step of making the parison having a finish form into a glass vessel by blowing off a first cooling air along the inside peripheral surface of the parison having a finish form and supplying a second cooling air that cools the outside peripheral surface of the parison having a finish form, wherein the press step (A) is carried out using a forming die having a parting line positioned at the shoulder part between the mouth ring part and body part of the parison having a finish form.

7 Claims, 23 Drawing Sheets

| p=1 | p=2 | p=3 | p=4 |
| Ave=12.2 | Ave=12.2 | Ave=12.2 | Ave=12.2 |
| σ=0.12 | σ=0.11 | σ=0.14 | σ=0.14 |

| p=1 | p=2 | p=3 | p=4 |
| Ave=12.2 | Ave=12.4 | Ave=12.0 | Ave=12.2 |
| σ=0.28 | σ=0.27 | σ=0.27 | σ=0.28 |

FIG.22A
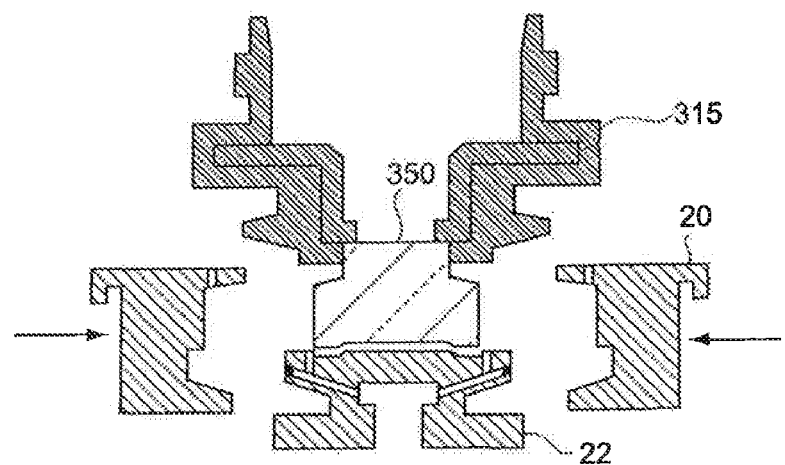
FIG.22B
FIG.22C
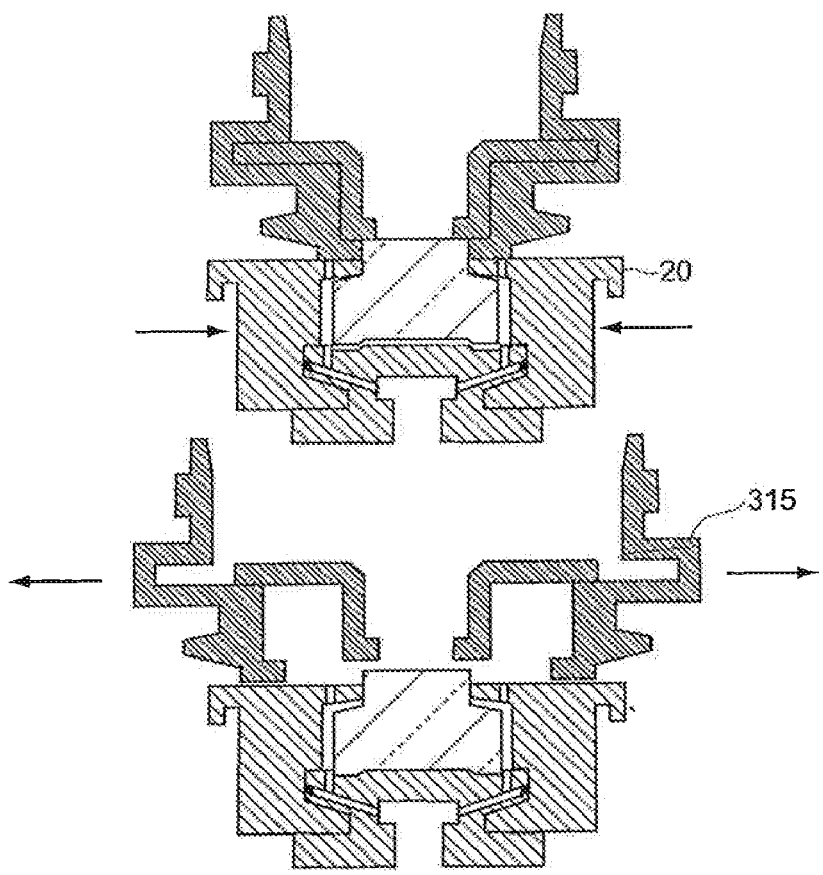
FIG.22D
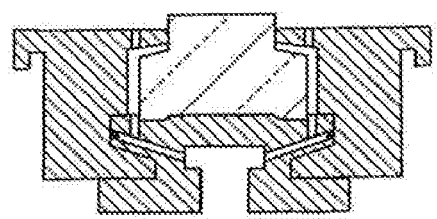

ONE-PRESS METHOD FOR PRODUCING GLASS VESSEL

CROSS REFERENCE TO RELATED APPLICATIONS

This application is a National Stage application of International Application No. PCT/JP2009/58805, filed May 12, 2009, the subject matter of which is incorporated by reference in its entirety.

BACKGROUND OF THE INVENTION

1. Field of the Invention

The present invention relates to a one-press method for producing a glass vessel, the method involving a process of forming a parison having a finish form and cooling the parison by one-time press molding (called as one press method) to produce a glass vessel efficiently.

The present invention relates particularly to a one-press method for producing a glass vessel, the method enabling efficient production of even a glass vessel having a specific parting line which is inconspicuous and the maximum thick wall part having a thickness larger than a predetermined value.

2. Description of the Related Art

Conventionally, because glass is chemically stable and superior in transparency, it is therefore frequently used as structural materials of glass vessels and these glass vessels are produced using a forming mold. As a method for producing such a glass vessel industrially and continuously, the blow and blow molding method and press and blow molding method are known.

For example, the blow and blow molding method is a production method in which a block of melt glass called a gob is filled in a rough mold and blow air is blown in this rough mold to form a parison. Then, this parison is transferred to a finishing mold to reheat and then, blow air is blown into the parison to swell it, thereby molding the parison into the form of the finishing mold.

The press and blow molding method is a production method in which a block of melt glass called a gob is filled in a rough mold and insert a plunger into the rough mold to form a parison. Then, this parison is transferred to a finishing mold to reheat and then, blow air is blown into the parison to swell it, thereby molding the parison into the form of the finishing mold.

However, the blow and blow molding method and the press and blow molding method have the feature that the produced glass vessel has an inside diameter larger on the body side than on the mouth side because blow air is blown into the parison. For this, in the case of using the glass vessel by filling it with a cream-like material such as cosmetics, there is a possibility of having a difficulty in taking out the content stuck to a position close to the mouth part in the body of the glass vessel.

Also, in these molding methods, blow air is blown to press the parison against the molding surface of the mold. Therefore, the surface irregularities of the molding surface of the mold and the trace of residual air in the mold are left on the surface of the obtained glass vessel and there is therefore a possibility of having inferior qualities.

Here, with regard to the problem as to the difficulty in taking out the content, it is possible to take out the content in the vessel easily by increasing the wall thickness of the glass vessel such that the mouth part and the body of the vessel have equal diameters.

With regard to the problem concerning the formation of irregularities on the surface of the glass vessel, this problem can be avoided by preventing the surface of the parison from being in contact with the mold when molding the glass vessel.

In light of this, a method for producing a bottle is proposed, the method enabling an efficient production of a glass vessel having such a shape and a wall thickness (see Patent Document 1).

More specifically, this proposed method is a one-press method for producing a bottle, the method involving a press step of forming a parison having a finish form by inserting a plunger into a finishing mold filled with a gob and a cooling step of transferring this parison having a finish form to a cooling mold to forcedly cool the outside peripheral surface and inside peripheral surface of a parison by a second cooling air blown to the outside of the cooling mold and a first cooling air blown to the inside of the parison.

FIG. 22 shows the situation where the step of cooling the parison having a finish form is carried out.

[Patent Document 1] JP2000211930A (Claims, FIGS. 1 to 3)

SUMMARY OF THE INVENTION

Problems to be Solved

However, in the one-press method for producing a bottle as described in Patent Document 1, a forming die base part 312 and a mouth die 315a including a forming mold 300 are opened along a parting line L2 placed at the position corresponding to the mouth ring part 350a of a parison 350 having a finish form as shown in FIG. 23, and therefore, a projecting part 312a having a thin fragment-like section is formed toward the parison 350 having a finish form on the inside surface of the forming die base part 312.

Specifically, the projecting part 312a having a thin wall fragment-like section and provided with a slant part which is in contact with the shoulder part inclined in a direction diagonal to the parison 350 having a finish form, a dividing part which is in contact with a mouth die 315a and forms a parting line (L2) and a top part which is in contact with the mouth ring parts 350a of the parison 350 having a finish form is formed on the inside surface of the forming die base part 312.

Therefore, the mouth ring part 350a of the parison having a finish form has been formed using not only the mouth die 315a but also a part (projecting part) 312a of the forming die base part so far.

Here, traces corresponding to the parting line of the mouth die and the forming die base part are formed at the position of the mouth ring part of the parison having a finish form. Because it is required for the mouth ring part to have given accuracy, such a problem arises that these traces corresponding to this parting line cannot be erased by carrying out flame abrasion treatment and the like.

Also, there is a problem that in the press step, such a projecting part is excessively heated, which is the reason for defects such as cracks at the mouth ring part of, particularly, the parison having the maximum thick wall part having a thickness larger than a predetermined value.

Moreover, the thin wall fragment-like projecting part is excessively heated and there is therefore such a problem that the mechanical strength of the projecting part is lowered, so that the mold is easily broken during the molding operation.

In the meantime, such an attempt is made to cool only the thin wall fragment-like projecting part by selectively blowing cooling air to the position of the forming mold corresponding to the projecting part from the side of the mold. However, this poses such a new problem that the distribution of temperature of the whole forming mold tends to be large. This also poses the problem as to a reduction in the final yield of the glass vessel.

In view of this situation, the inventors of the present invention have made earnest studies concerning the above problems and, as a result, found that not only the traces corresponding to the parting line can be made to be inconspicuous but also such traces corresponding to the parting line can be erased by carrying out flame abrasion treatment, by using a forming mold which divides the forming die base part and the mouth die into at least two parts by a parting line (hereinafter, referred to as "shoulder parting line") positioned at the shoulder part between the mouth ring part (hereinafter, referred to as "neck part", in some cases) and a body part of the parison having a finish form.

Accordingly, it is an object of the present invention to provide a one-press method for producing a glass vessel having a good appearance stably.

Disclosure of Invention

According to the present invention, there is provided a one-press method for producing a glass vessel, the method successively including;

(A) a press step of molding, by one press, a parison which is provided with a body part, a mouth ring part and a shoulder part between the body part and the mouth ring part and has a finish form by pouring a gob into a forming mold used to mold the parison having a finish form from the gob by using a forming die including a forming die base part and a mouth die which are each divided into two parts by a predetermined parting line and then by inserting a plunger into the forming mold after pouring the gob, (B) a transfer step of transferring the parison having a finish form to a cooling mold provided with a support section which supports the mouth ring part of the parison having a finish form, a mounting section on which the bottom part of the parison having a finish form is mounted and a blow head which internally cools the parison having a finish form in the condition that the parison is grasped by the mouth die, and (C) a cooling step of making the parison having a finish form into a glass vessel by blowing off a first cooling air along the inside peripheral surface of the parison having a finish form from the blow head and supplying a second cooling air that cools the outside peripheral surface of the parison having a finish form, along the outside peripheral surface of the parison having a finish form from a discharge port disposed in the mounting section, wherein the press step (A) is carried out using a forming die having a parting line positioned at the shoulder part between the mouth ring part and body part of the parison having a finish form.

The use of the forming die having a specified parting line (called as shoulder parting line) in this manner ensures that not only the traces corresponding to the parting line can be made to be inconspicuous but also such traces corresponding to the parting line can be erased by carrying out flame abrasion treatment.

Also, the thin wall fragment-like projecting part formed on the inside surface of the forming die is not necessarily provided by using the forming die having a specified parting line. Therefore, the heating problem, the problem as to the breakdown of the mold and further the problem as to cooling caused by the projecting part can be solved all at once.

Further, in the cooling step (C), not only the parison having a finish form in the cooling mold can be efficiently cooled but also the far-infrared rays emitted from the parison having a finish form can be efficiently absorbed by combining the first cooling air and the second cooling air.

Even in the case of a parison having a finish form and the maximum thick wall part having a thickness larger than a predetermined value, the parison can be molded by one-press to produce a glass vessel having a good appearance stably and efficiently.

Also, when the one-press method for producing a glass vessel according to the invention of the application of this case is carried out, the inside surface of the forming die base part is preferably a vertical plane or a slant plane having no projecting part.

The use of the predetermined forming die base part in this manner enables certain solution of the problem that the thin wall fragment-like projecting part is excessively heated to easily cause defects such as cracking of the mouth ring part of the parison having a finish form, since the thin wall fragment-like projecting part is not formed on the inside surface of the forming die.

Also, because the thin wall fragment-like projecting part is not formed, the problem that the mechanical strength of the projecting part is so lowered that the mold is easily broken, can be solved.

Moreover, since the thin wall fragment-like projecting part is not formed, it is unnecessary to cool selectively, which brings about an improvement in the yield of a glass vessel, leading to a reduction in production cost.

Also, when the one-press method for producing a glass vessel according to the invention of the patent application of this case is carried out, a guide member is preferably disposed inside of the mouth die.

The formation of the guide member at a given position makes it possible to effectively improve the positional accuracy when the two-divided type mouth dies are combined.

Also, when the one-press method for producing a glass vessel according to the invention of the patent application of this case is carried out, the guide member is disposed inside of the mouth die through a spring member.

If the guide member is disposed at a specified position through a spring member in this manner, the guide member is forcibly centered by the work of the spring member and therefore, the parison having a finish form can be mounted at a specified position highly accurately even when the transfer step (B) is carried out to open the mouth die.

Incidentally, because the conventional forming die has a predetermined parting line (hereinafter, referred to as "neck parting line", in some cases) at the position corresponding to the mouth ring part of the parison having a finish form, the cooling mold can be closed in the condition that the parison having a finish form is grasped by the mouth die when the transfer step (B) is carried out to transfer the parison having a finish form to the cooling mold. Therefore, even in the case where the guide member disposed through the spring member is not formed, the place where the parison having a finish form is mounted can be fixed. Therefore, a deviation from the place where the parison having a finish form is mounted in the cooling mold when the transfer step (B) is carried out may be understood as the problem which arises in the case of using a forming mold having the shoulder parting line.

Also, when the one-press method for producing a glass vessel according to the invention of the patent application of this case is carried out, the mouth die is preferably divided into two parts and a mouth die aligning member is preferably disposed in contact with the parting line of the mouth die divided into two parts.

When the mouth die aligning member is disposed at a specified position, the positional accuracy between the mouth die and the forming die base part is improved and also, the whole yield of the glass vessel can be significantly improved.

Also, when the one-press method for producing a glass vessel according to the invention of the patent application of this case is carried out, the parison having a finish form preferably has the maximum thick wall part of 0.8 cm or more in thickness.

Even a parison having a finish form and a predetermined thick wall part can be molded by one press and cooled uniformly and efficiently, so that it can be produced as a glass vessel having a good appearance stably and efficiently.

Also, when the one-press method for producing a glass vessel according to the invention of the patent application of this case is carried out, the amount of steam to be contained in the first cooling air is preferably designed to be in a range from 15 to 130 g/m$^3$.

If the first cooling air containing saturated steam in a predetermined amount is used, not only the parison having a finish form in the cooling mold can be cooled uniformly and efficiently, but also the far-infrared rays emitted from the parison having a finish form can be absorbed efficiently.

Also, when the one-press method for producing a glass vessel according to the invention of the patent application of this case is carried out, the temperature and the relative humidity of the first cooling air is preferably controlled by a heat exchanger provided with an air intake port, an air passage, a cooling air discharge port and a cooling part using a cooling medium around the air passage.

The first cooling air having a predetermined temperature and a relative humidity can be obtained efficiently and at low costs by using such a heat exchanger.

Particularly, even in the case of taking the open air in the air intake port as it is, the first cooling air having a predetermined temperature and a relative humidity can be obtained efficiently and therefore, the heat exchanger is suitable.

BRIEF DESCRIPTION OF THE DRAWINGS

FIGS. 22A and 22D are views for explaining the situation where a parison having a finish form is transferred from a mouth die to a cooling mold in the conventional techniques.

EMBODIMENTS OF THE INVENTION

Figure 1:
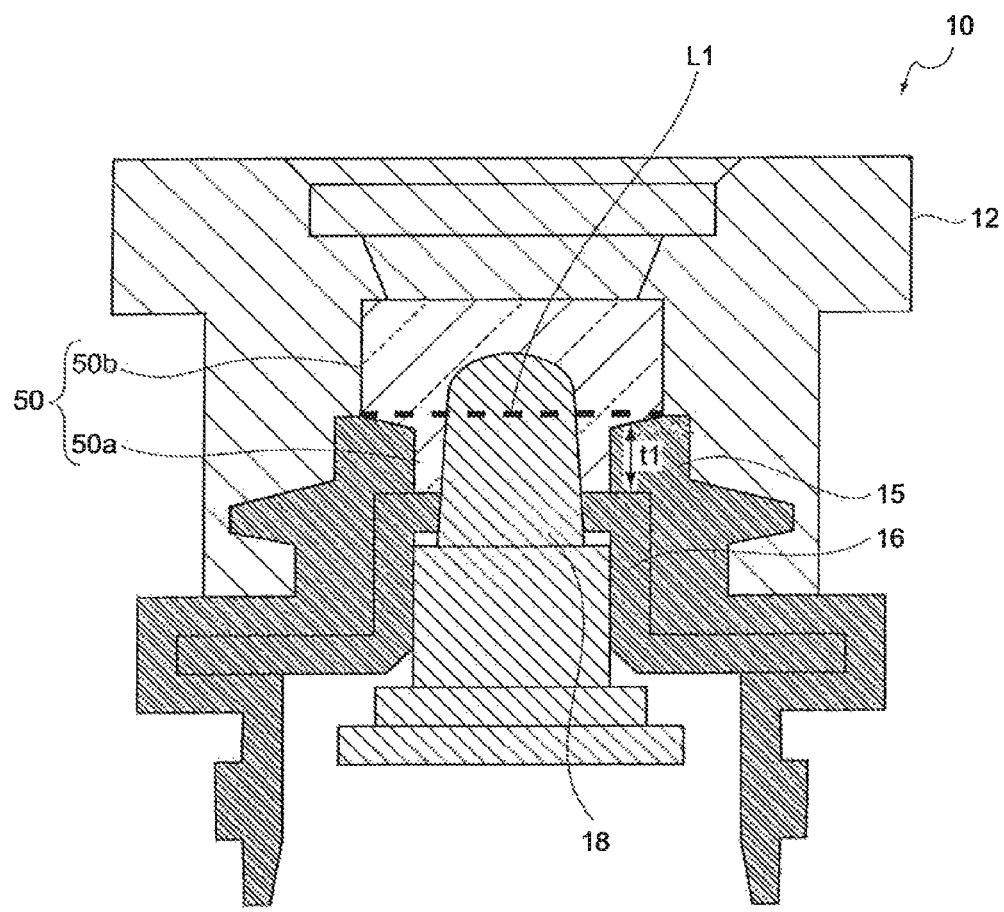
FIG. 1 is a view for explaining a forming mold.

According to an embodiment of the present invention, a one-press method for producing a glass vessel includes (A) a press step of molding, by one press, a parison which is provided with a body part, a mouth ring part and a shoulder part between the body part and the mouth ring part and has a finish form by pouring a gob into a forming mold used to mold the parison having a finish form from the gob by using a forming die including a forming die base part and a mouth die which are each divided into two parts by a predetermined parting line and then by inserting a plunger into the forming mold, (B) a transfer step of transferring the parison having a finish form to a cooling mold provided with a support section which supports the mouth ring part of the parison having a finish form, a mounting section on which the bottom part of the parison having a finish form is mounted and a blow head which internally cools the parison having a finish form in the condition that the parison is grasped by the mouth die, and (C) a cooling step of making the parison having a finish form into a glass vessel by blowing off a first cooling air along the inside peripheral surface of the parison having a finish form from the blow head and supplying a second cooling air that cools the outside peripheral surface of the parison having a finish form, along the outside peripheral surface of the parison having a finish form from a discharge port disposed in the mounting section, wherein as shown in FIG. 1, the press step (A) is carried out using a forming die 10 having a parting line L1 positioned at the shoulder part between the mouth ring part 50a and the body part 50b of the parison 50 having a finish form.

The embodiment of the one-press method for producing a glass vessel according to the present invention will be described in detail together with a glass vessel which is a subject of the present invention and an apparatus for producing a glass vessel which is used to carry out the one-press production method.

Incidentally, a glass vessel which is obtained in a forming die before cooled in a cooling mold is called a parison having a finish form and the parison having a finish form which is in the state cooled to a predetermined temperature in a cooling mold is called a glass vessel.

1. Glass Vessel

There is no particular limitation to the outward shape of the glass vessel and as to the outward shape, for example, a rectangular glass bottle, cylinder glass bottle, deformed glass bottle, rectangular glass box, cylinder glass boxy and deformed glass box are exemplified.

Also, the one-press method for producing a glass vessel is a method for forming a finish shape by one press and therefore, a glass vessel in which the mouth and body of the vessel have the same inside diameter in the present invention may be a subject.

In other words, in the case of such a glass vessel, even cream-like products such as cosmetics are easily taken out and practical convenience can be improved.

Figure 2A:
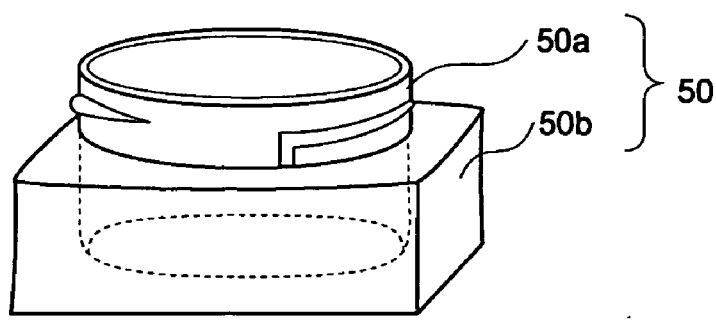
FIGS. 2A to 2D are views for explaining a glass vessel.

Also, a glass vessel 50 shown in FIGS. 2A to 2D is a typical example. More specifically, FIG. 2A shows a glass vessel 50 provided with a square prismatic body 50b having an almost square plane shape and a cylindrical mouth ring part 50a.

In the case of such a glass vessel, traces corresponding to the parting line can be made to be more inconspicuous and traces corresponding to the parting line existing on the shoulder part can be erased by performing, for example, flame abrasion treatment.

Figure 2B:
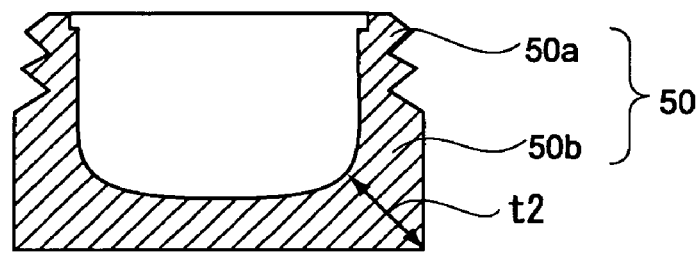

Also, FIG. 2B is a sectional view of the glass vessel 50 shown in FIG. 2A.

Figure 2C:
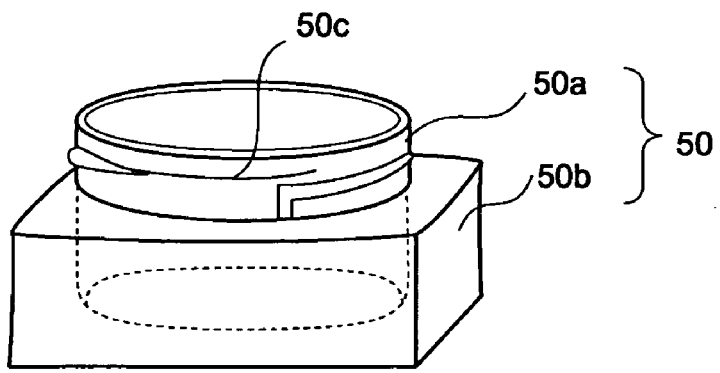

Moreover, FIG. 2C shows the glass vessel 50 provided with a groove part 50c entirely or partly along the periphery of the mouth ring part 50a of the glass vessel 50 shown in FIG. 2A.

The reason why the groove part 50c is formed is that when the groove part 50c like this is formed, air left unremoved in the inside of the mold easily escapes through this groove part 50c and also, the moldability of the mouth ring part 50a is improved.

The groove part 50c preferably has a width range from 0.1 to 2 mm and a depth range from 0.1 to 1 mm.

Figure 2D:
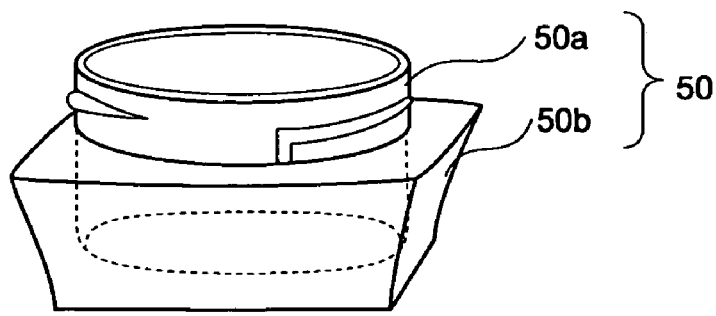

Also, FIG. 2D shows a glass vessel 50 having a structure in which the body part 50b has not a vertical plane but a slant plane as shown in FIG. 2A.

Though the slant plane in FIG. 2D has a structure narrowed toward its bottom part from the shoulder part, it may be, for example, a slant plane spread from the shoulder part to the bottom part and there is no particular limitation to the structure of the slant plane.

The present invention has the characteristics that a deterioration in the appearance of the parison having the maximum thick wall part having a wall thickness larger than a predetermined value and the number of surface irregularities can be reduced, as its peculiar effect. In the present invention, it is therefore preferable to adopt, as the subject, the outward appearance of a glass vessel resulting from a parison having a finish form and the maximum thick wall part (t2) having a thickness of 0.8 cm or more as specifically shown in FIG. 2B.

When the thickness of the maximum thick wall part (t2) is excessively large, it is difficult to stably produce a glass vessel by one-press production method. It is therefore preferable that the thickness of the maximum thick wall part is designed to be preferably in a range from 1 to 5 cm and more preferably in a range from 1.2 to 3 cm.

In this case, the thickness of the maximum thick wall part (t2) in the glass vessel means the shortest distance from the bottom or side surface or from the corner of the glass vessel as shown in FIG. 2B to the inside surface of the glass vessel.

2. Apparatus for Producing a Glass Vessel
(1) Basic Structure

Figure 3:
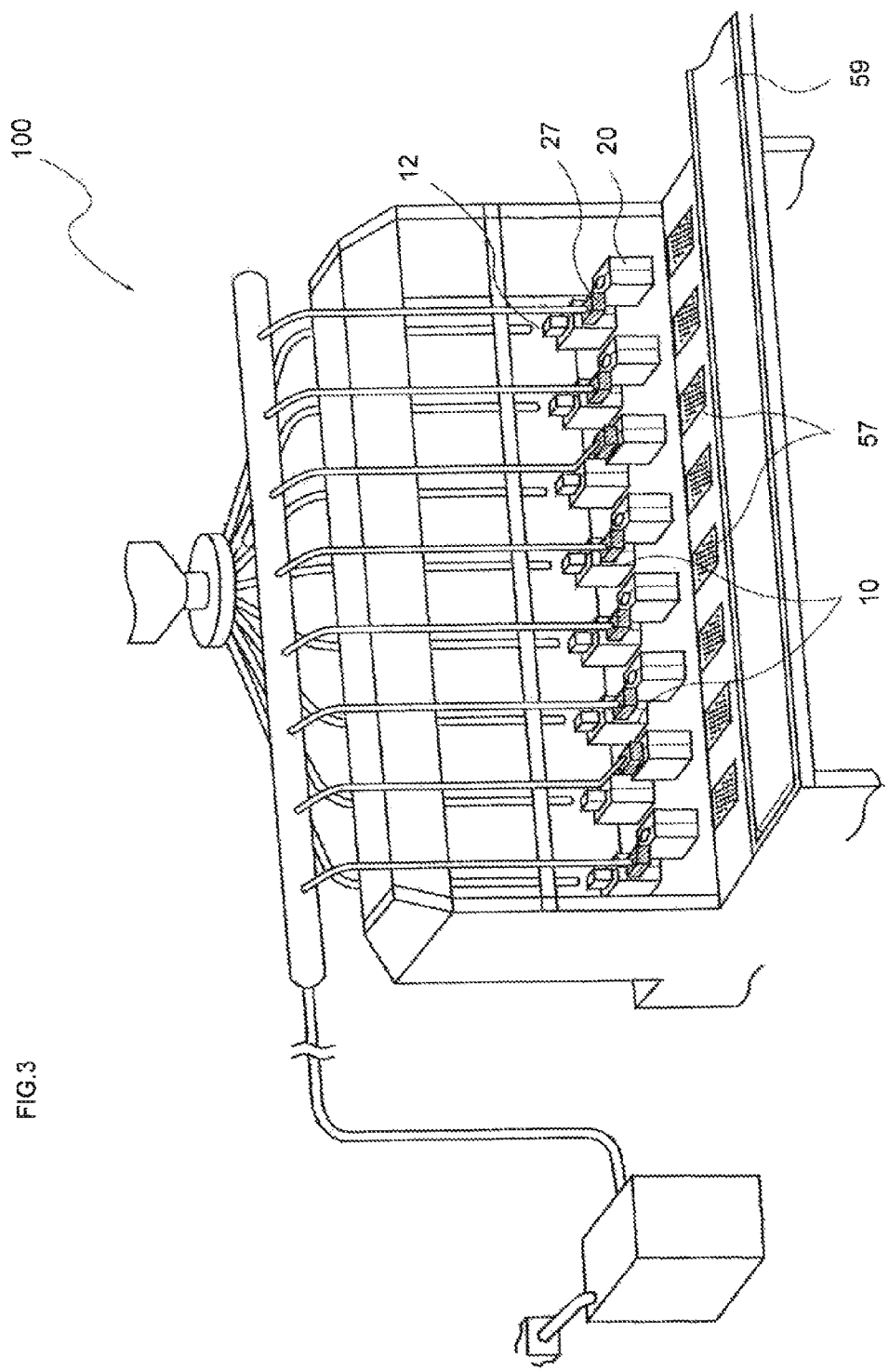
FIG. 3 is a view showing an apparatus for producing a glass vessel.

As the apparatus for producing a glass vessel, an individual section machine (called as IS machine) 100 may be basically used as shown in FIG. 3.

In this case, the apparatus has a structure in which a forming die 10 is used in place of the conventional die to be filled with a gob and a parison molded in a finish form by the forming die 10 is transferred to a cooling mold 20, followed by cooling the parison by using a blow head 27 and the cooling mold 20.

In other words, this is an apparatus for producing a glass vessel, the apparatus enabling the omission of the conventional reheating step and blow step, thereby making possible to produce a glass vessel only by forming a parison having a finish form by one press and by cooling the parison having a finish form.

Therefore, a glass vessel having a specific shape, for example, a glass vessel in which the mouth part and body of the vessel have the same inside diameter can be easily produced easily and continuously.

(2) Forming Die

Also, the forming die 10 shown in FIG. 1 is a mold that forms the parison 50 having a finish form as a glass vessel with high accuracy and high productivity by press molding using a plunger 18.

Then, the present invention is characterized by the use of the forming die 10 in which the parting line L1 is positioned at the shoulder part between the mouth ring part 50a and the body part 50b of the parison 50 having a finish form.

Figure 23:
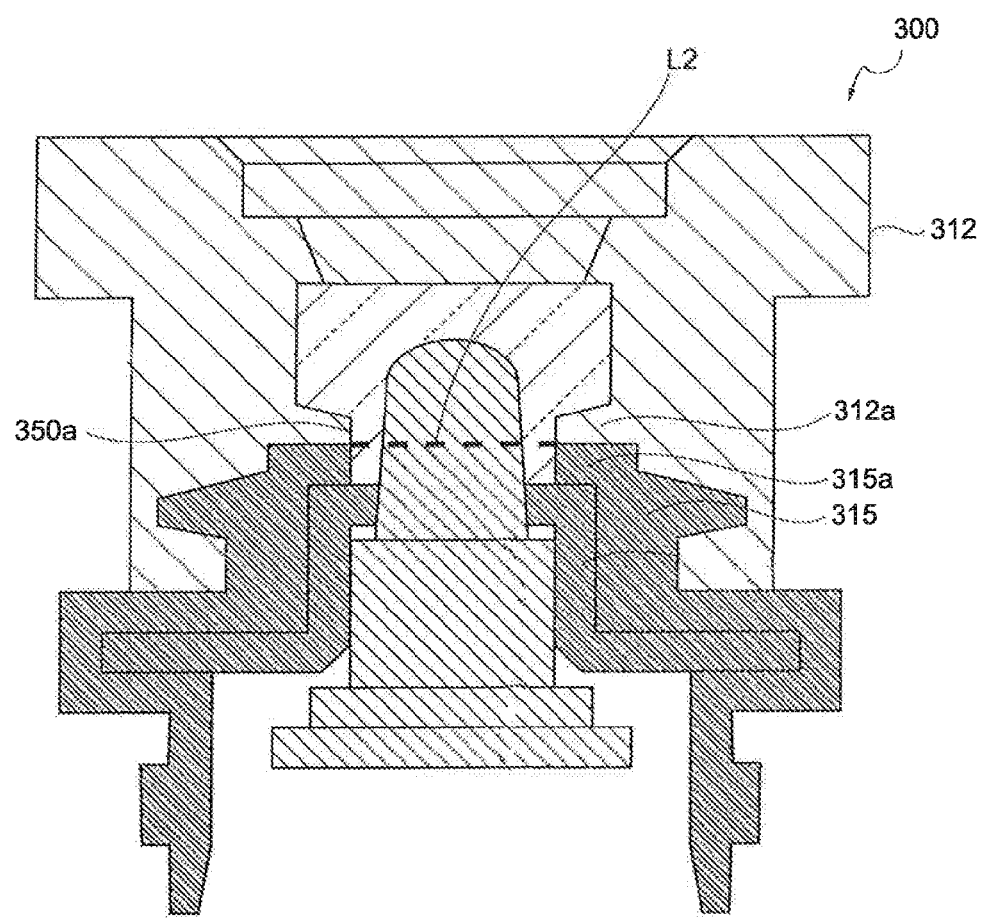
FIG. 23 is a view for explaining a forming mold in the conventional techniques.

This is because a thin wall fragment projecting part 312a conventionally formed on the inside surface of the forming die base part 312 as shown in FIG. 23 may not be formed by using the divided type forming die having a specific parting line. Specifically, a heating problem, a problem as to the breakdown of the mold and further, a problem as to cooling caused by the projecting part disposed in the conventional forming die base part can be solved all at once.

Accordingly, even a parison having a finish form and the maximum thick wall part having a thickness larger than a predetermined value can be molded by one press to thereby produce a glass vessel having a good outward appearance stably and efficiently.

Here, as shown in FIG. 1, the inside surface of the forming die base part 12 is preferably a vertical plane or a slant plane having no projecting part.

This is because when the above specified forming die base part is used, the problem that because the conventionally used projecting part is not formed, the phenomenon that the projecting part is excessively heated to cause easy production of defects such as cracks at the mouth ring part of the parison having a finish form can be surely solved.

Also, because the thin wall fragment-like projecting part is not formed, the problem that the mechanical strength of the projecting part is reduced so that the mold is easily broken can also be surely solved.

Moreover, because the thin wall fragment-like projecting part is not formed, it is unnecessary to selectively cool the parison, and therefore, the yield of the glass vessel is improved making it possible to reduce the production costs.

Also, as shown in FIG. 1, a guide member 16 is preferably disposed inside of the mouth die 15.

This reason is that the formation of the guide member at a given position makes it possible to effectively improve the positional accuracy when the two-divided type mouth dies are combined.

Figure 4A:
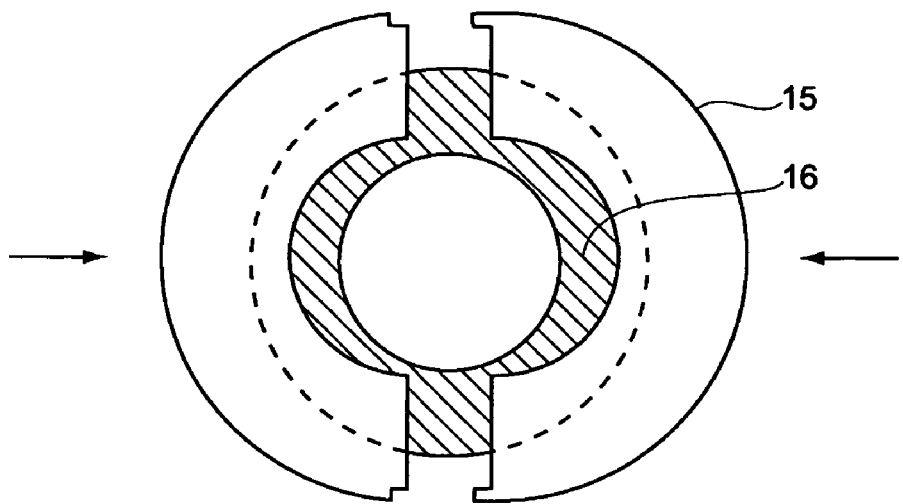
FIGS. 4A to 4C are views for explaining a guide member.
Figure 4B:
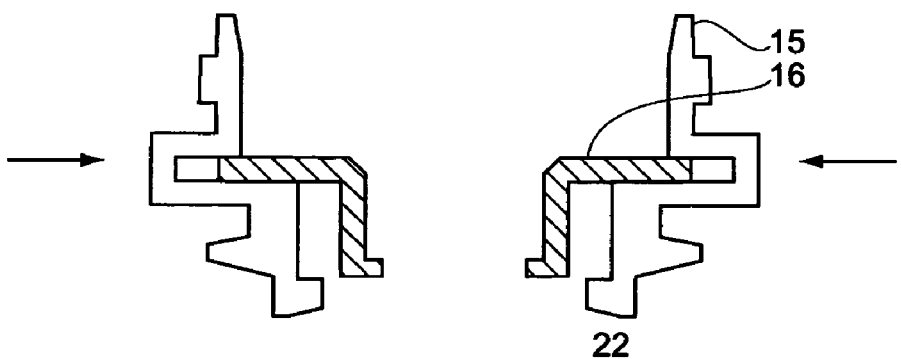
Figure 4C:
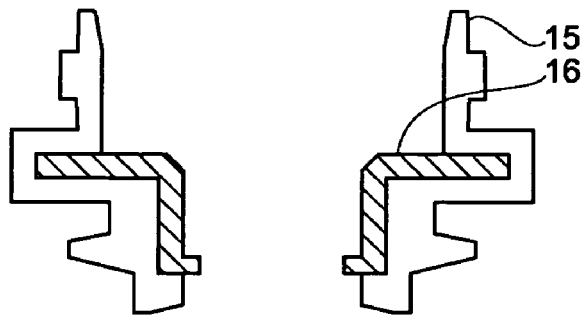

Specifically, as shown in FIGS. 4A to 4C, it is required that the mouth die 15 at which the mouth ring part of the glass vessel is to be formed has particularly high dimensional accuracy even when the binding and twofold division are repeated.

More specifically, the two-divided type mouth die 15 is combined in the condition that the concave part of the mouth die 15 divided into two and the guide member 16 are engaged with each other, thereby enabling an improvement in positional accuracy efficiently.

Figure 5A:
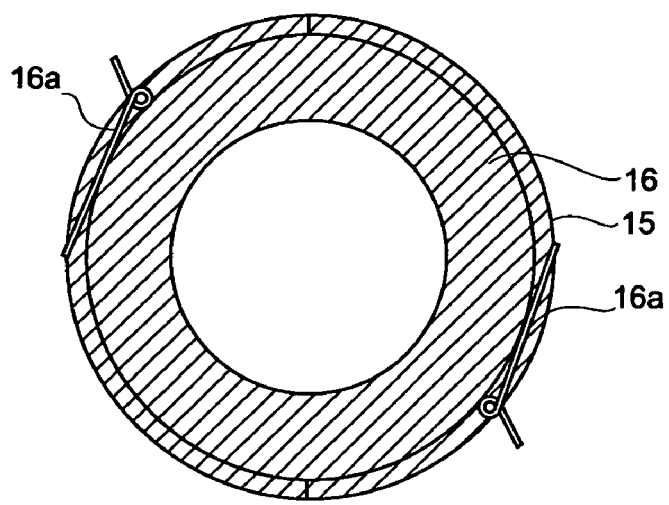
FIGS. 5A and 5B are views for explaining the structure of a guide member through a spring.
Figure 5B:
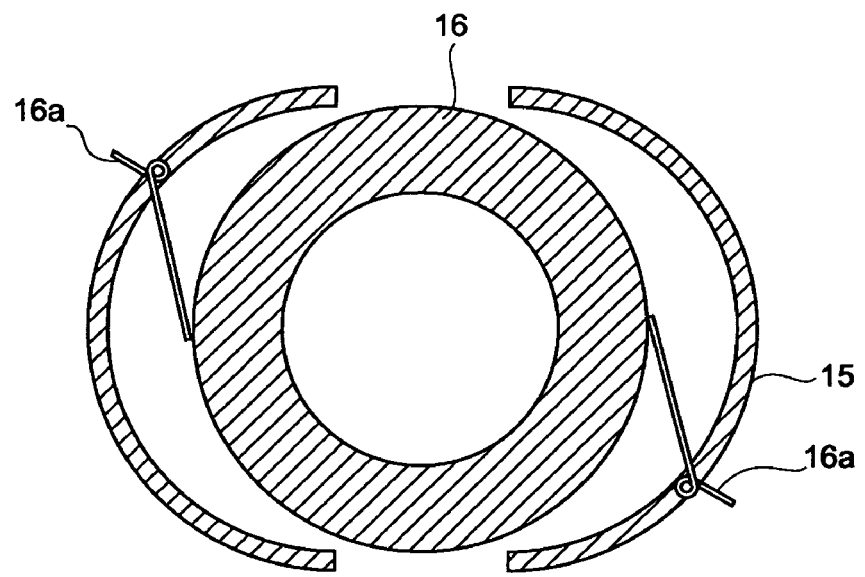
Figure 6A:
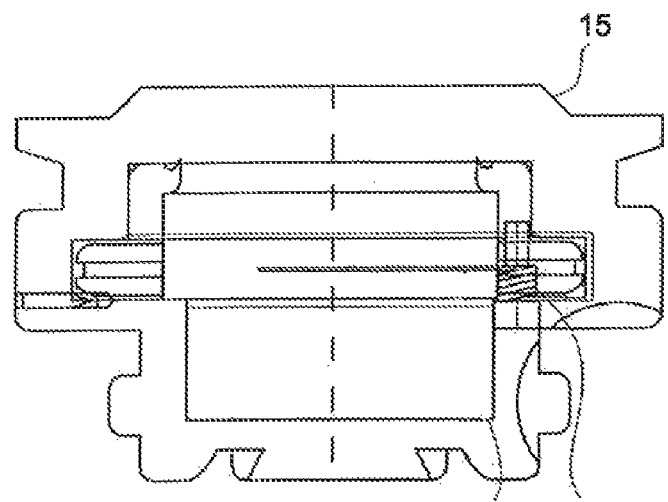
FIGS. 6A and 6B are other views for explaining the structure of a guide member through a spring.
Figure 6B:
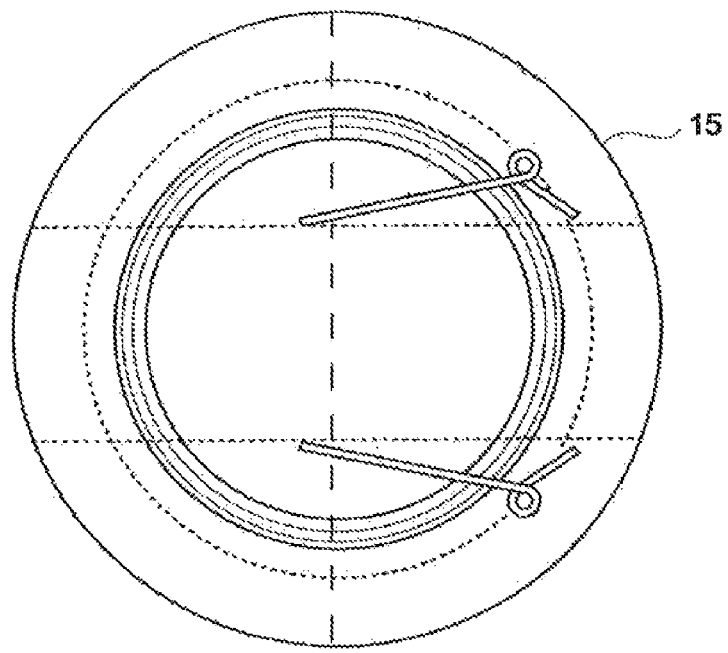

Also, as shown in FIGS. 5 and 6, the guide member 16 is installed inside of the mouth die 15 through a spring material 16a.

This reason is that if the guide member is disposed at a predetermined position through a spring member, the guide member 16 is forcibly centered by the work of the spring material 16a and therefore, the parison having a finish form can be mounted at a specified position highly accurately even when the transfer step (B) is carried out and the mouth die 15 is opened as shown in FIG. 5B.

Figure 7A:
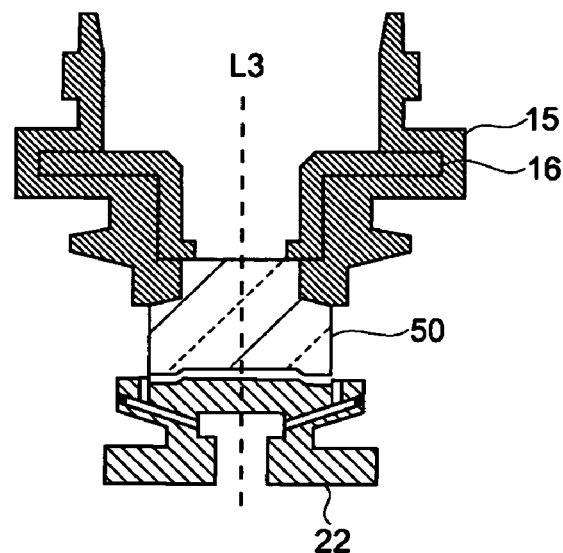
FIGS. 7A to 7C are views for explaining the situation where a parison having a finish form is transferred from a mouth die to a cooling mold when using no guide member through a spring.
Figure 7B:
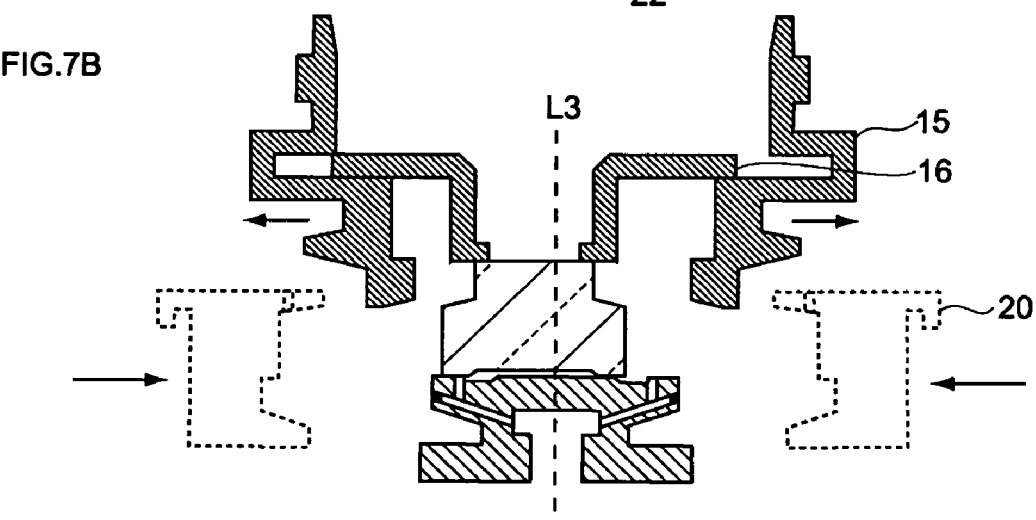
Figure 7C:
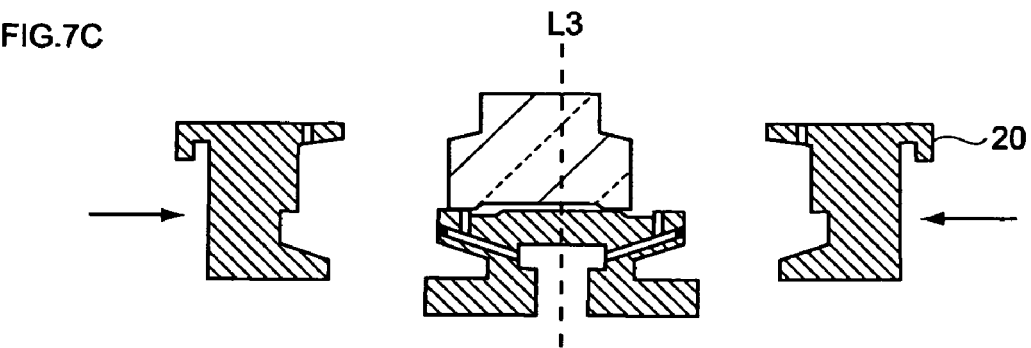
Figure 8A:
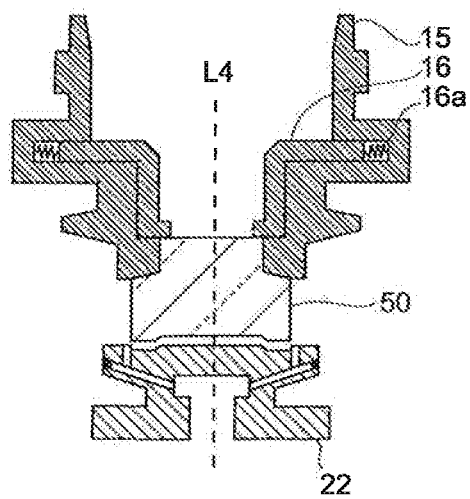
FIGS. 8A to 8D are views for explaining the action of a guide member through a spring.
Figure 8B:
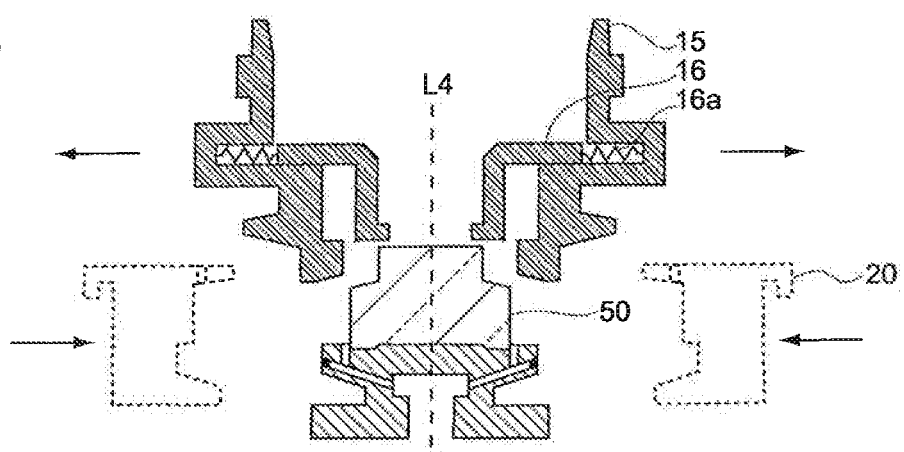
Figure 8C:
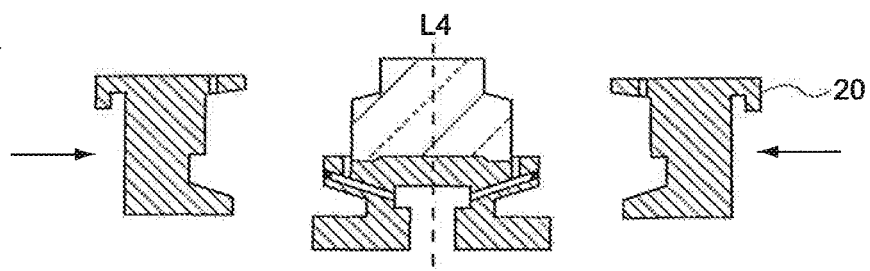
Figure 8D:
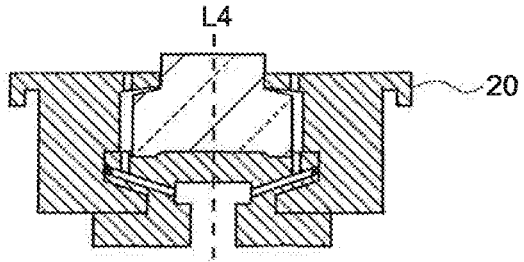

Specifically, in the case where no guide member through a spring material is formed, the position of the parison 50 having a finish form tends to deviate from a predetermined position (center line L3) of a mounting position 22 in the cooling mold 20, when the transfer step (B) is carried out as shown in FIGS. 7A to 7C.

To describe in more detail, in the present invention, the mouth die 15 is a hindrance to the access of the cooling mold 20 from both sides of the parison 50 having a finish form as shown in FIG. 7B.

It is therefore necessary to mount the parison 50 having a finish form at a predetermined position of the mounting position 22 by the mouth die 15 and to evade the access of the mouth die 15 having a fish form to the vicinity of the parison 50 having a finish form before moving of cooling mold 20 closely to the parison 50 having a finish form.

Therefore, the parison 50 having a finish form is mounted on the mounting position 22 in the condition that it is not supported by the cooling mold 20, with the result that it tends to deviate from a predetermined position.

Thus, it is effective to dispose the guide member through a spring material that restrict the generation of such a deviation.

Incidentally, the conventional forming die is, as shown in FIG. 23, a forming die 300 in which a predetermined parting line L2 (hereinafter, referred to as a neck parting line in some cases) exists at the position corresponding to the mouth ring part of the parison 350 having a finish form. Therefore, as shown in FIGS. 22A to 22D, the cooling mold 20 can be closed in the condition that the parison 350 having a finish form is grasped by the mouth die 315 when the transfer step (B) is carried out to transfer the parison 350 having a finish form to the cooling mold 20. Therefore, even in the case where the guide member disposed through the spring member is not formed, the place where the parison 350 having a finish form is mounted can be fixed. Therefore, the deviation from the place where the parison having a finish form is mounted in the cooling mold when the transfer step (B) is carried out may be understood as the problem which arises in the case of using a forming mold 10 having a shoulder parting line L1 as shown in FIG. 1.

Then, explanations will be furnished as to the case of installing a guide member through a spring material with reference to FIGS. 8A to 8D.

Specifically, in the case of installing the guide member 16 through a spring material, the parison 50 having a finish form can be guided to a predetermined position of the mounting position 22 stably by the guide member 16 that can fix the parison to a predetermined position (center line L4) by a spring 16a and the like even in the case of avoiding the mouth die 15 from the vicinity of the parison 50 having a finish form.

Therefore, the parison 50 having a finish form can be mounted on a predetermined position of the mounting position 22 stably though it is not in the situation where it is supported by the cooling mold 20.

Incidentally, though not shown in the drawing, the surfaces of the guide member 16 through a spring material and the parison 50 having a finish form are not simply in contact with each other but the both are slightly engaged with each other, and this engagement contributes to the centering of the parison 50 having a finish form by the sake of the guide member 16 through a spring.

Also, as shown in FIGS. 5 and 6, the spring material 16a is preferably a coil spring.

This reason is that durability under a high-temperature condition can be significantly improved by using the coil spring.

Figure 9A:
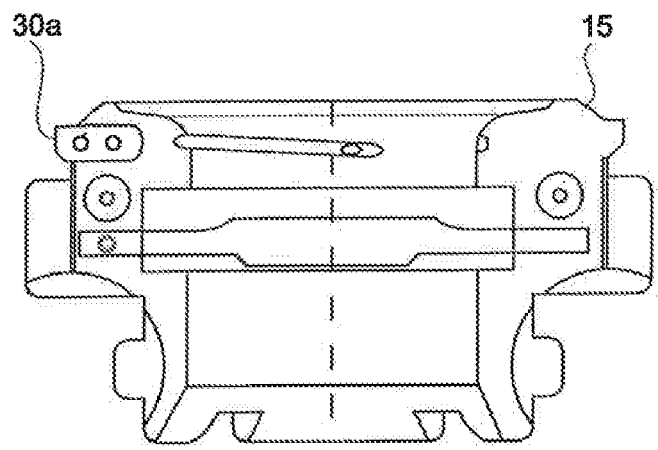
FIGS. 9A and 9B are views for explaining a mouth die aligning member.
Figure 9B:
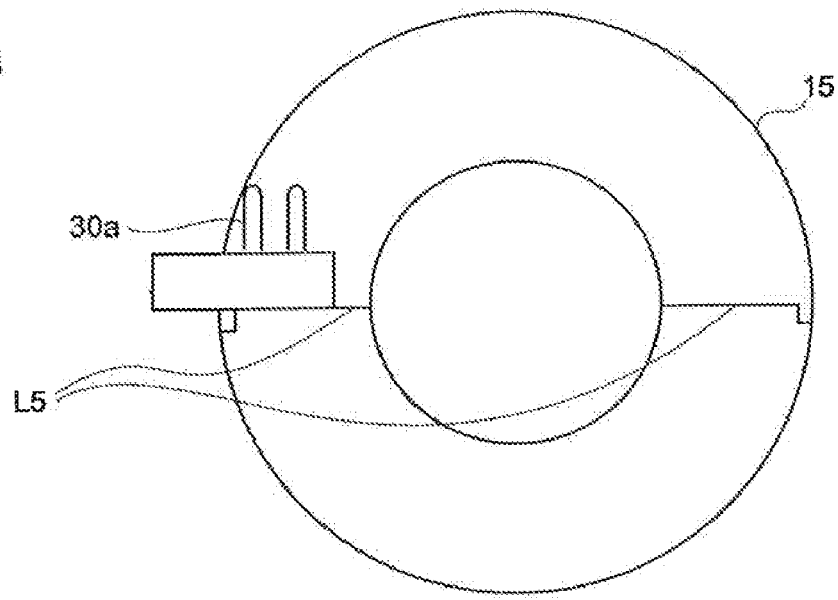

Also, as shown in FIG. 9, the mouth die 15 is preferably divided into two parts and a member 30 for aligning the mouth die 15 is preferably installed in contact with the parting line L5 of the mouth die 15 divided into two parts.

This reason is that when the member for aligning the mouth die 15 is disposed at a predetermined position in this manner, the positional accuracy between the mouth die and the forming die base part is improved and the yield of the glass vessel as a whole can be significantly improved.

Figure 10A:
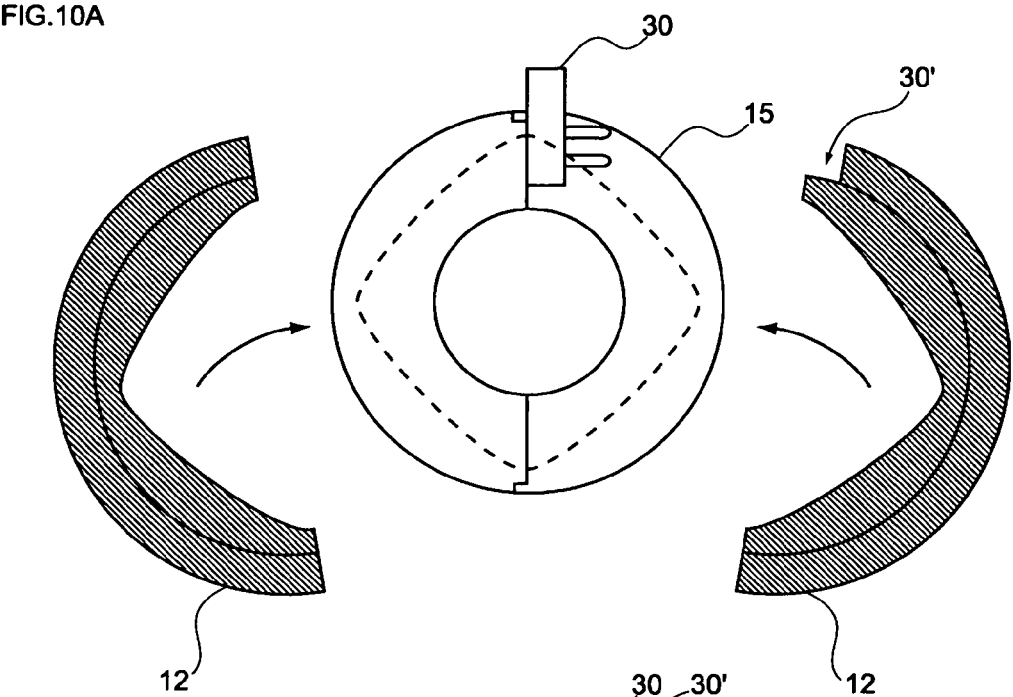
FIGS. 10A and 10B are views for explaining the action of a mouth die aligning member.
Figure 10B:
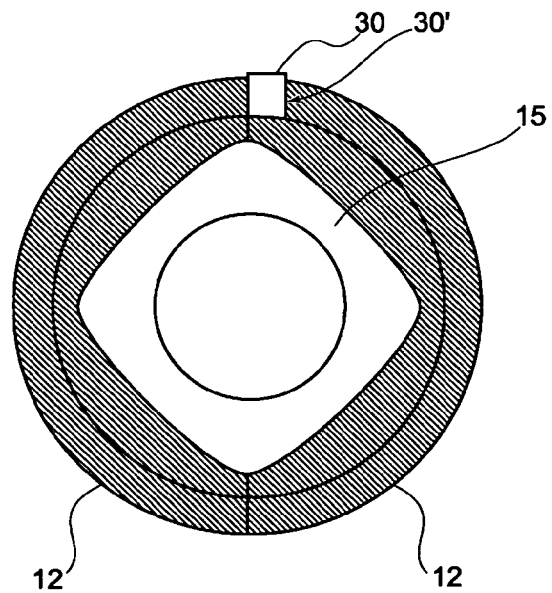

Specifically, unlike the case of producing a glass vessel having a cylinder body part as shown in FIG. 2, it is necessary to exactly accord each corresponding position of the mouth die 15 and the forming die base part 12 to each other as shown in FIGS. 10A and 10B to produce the glass vessel having a square prismatic body.

More specifically, when the corners of a square at the shoulder part of the glass vessel formed in the mouth die 15 and the corners of a square at the body part of the glass vessel to be formed on the forming die base part 12 do not accord to each other, this forming die cannot function as a forming die for producing a glass vessel having a square prismatic body as shown in FIG. 2.

Also, in the case of a divided type forming die as shown in FIGS. 10A and 10B, the mouth die 15 is first coupled and then the forming die base part 12 is coupled. Therefore, it is preferable that the member 30 for aligning the mouth die 15 be made to have a convex form and corresponding to this, the forming die base part 12 be provided with a concave part 30'.

In this case, any material may be used as the aligning member 30 without any particular limitation insofar as it is a material having predetermined strength.

Also, no particular limitation is imposed on the shape and size of the aligning member 30, and any material may be used insofar as it can be engaged with the concave part 30' formed on the forming die base part 12.

When, for example, stainless is used as the material of the aligning member, the stainless material may be fixed to the mouth die 15 by a bolt 30a as shown in FIG. 9 (b) and the stainless material may be designed to have the following size: a length of the projecting part is 15 mm and a width thereof is 10 mm.

Then, an embodiment in which a parison 50 having a finish form is molded by using a plunger 18 in a forming die 10 will be described with reference to FIG. 1.

First, this forming die includes, for example, iron, iron alloys, brass or copper-nickel alloys and its shape can be arbitrarily changed corresponding to the outside shape of the glass vessel to be formed. Similarly, the plunger may also be constituted using the same material as the forming die and also, its shape may be arbitrarily changed corresponding to the inside shape of the glass vessel to be produced.

Using these forming die and plunger, molten glass (gob) is filled in the forming die and also, the plunger is inserted into the forming die filled with the gob, thereby making it possible to easily form a glass vessel having a specified finish form in which the mouth part and body part of the vessel have the same inside diameter.

Also, the plunger 18 shown in FIG. 1 includes a plunger element which is a metal cylinder member with a round top, a cooler which is received in the plunger element so as to form a space for a cooling air passage and is provided with a large number of blow-off holes and an air introduction path further received in the cooler.

Therefore, cooling air introduced through the air introduction path is first introduced into the space from these many blow-off holes formed at the top of the cooler and in the vicinity of the top of the cooler.

Then, the cooling air is allowed to pass through the space to cool the inside of the plunger element uniformly and is then discharged from the system. During this course, the whole plunger 18 can be cooled to a prescribed temperature.

Also, the temperature of the forming die is preferably designed to be 400 to 700° C. though it may be determined in consideration of, for example, the moldability and outward appearance and economy.

This reason is that when the temperature of the forming mold is limited in the above range, this limits a deterioration in outward appearance and reduces the number of surface irregularities caused when a parison having the maximum thick wall part having a thickness larger than a predetermined value is molded by one press without producing excessive strain and is cooled.

More specifically, when the temperature of the forming die is below 400° C., the moldability of the parison is excessively deteriorated and there is therefore the case where the parison is deteriorated in outward appearance and is increased in the number of surface irregularities to be generated in the cooling step.

Also, when the temperature of the forming die exceeds 700° C. on the other hand, the moldability and cooling capability of the parison are insufficient. In contrast, there is the case where the parison is deteriorated in outward appearance and is increased in the number of surface irregularities to be generated in the cooling step.

Therefore, the temperature of the forming die is designed to be preferably in a range from 450 to 680° C. and more preferably in a range from 500 to 650° C.

(3) Cooling Mold

Also, the cooling mold 20 shown in FIGS. 7 and 8 is a mold used to receive the parison 50 having a finish form therein and to cool the parison 50.

Figure 11A:
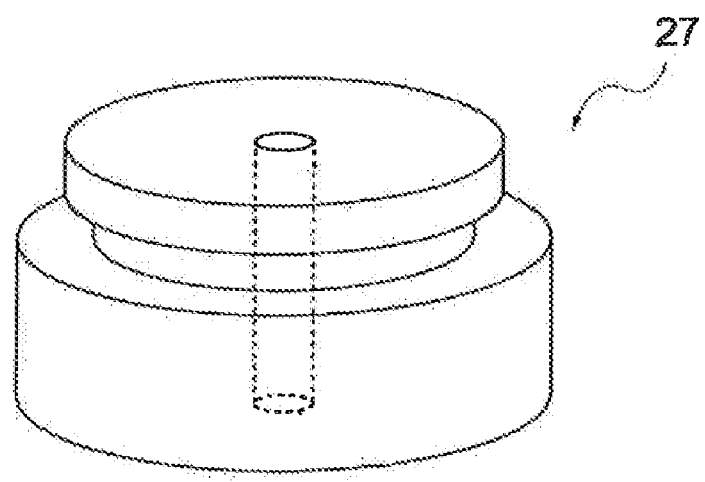
FIGS. 11A and 11B are views for explaining the relations to a blow head and a cooling mold.
Figure 11B:
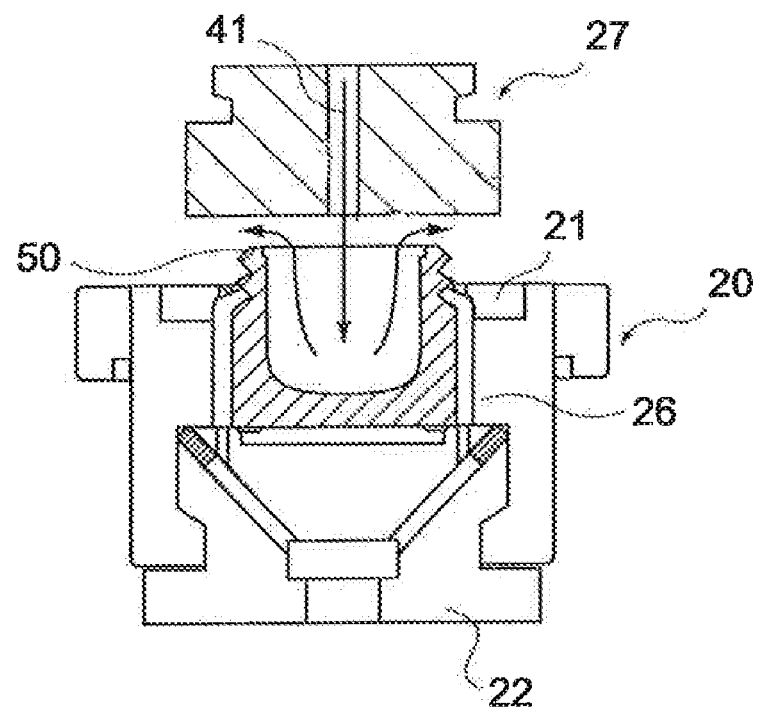

As shown by one example in FIG. 11B, the cooling mold 20 is provided with a support part 21 that supports the mouth die 50a of the parison 50 and a mounting part 22 on which the bottom of the parison 50 is mounted.

The cooling mold 20 exemplified in FIG. 11B includes a finish die 26 disposed at the position corresponding to the side surface of the parison 50, a support part 21 disposed at the position corresponding to the mouth die in the finish die 26 and a bottom die 22 as the mounting part.

The cooling mold is different from the forming die and only serves to cool the parison having a finish form. Also, because the cooling mold is not in direct contact with the parison having a finish form at the side thereof. Therefore, the cooling mold includes a cast material, iron alloy, brass or the like and has a shape to be optionally changed in accordance to the external shape of the glass vessel to be produced.

In this case, the inside surface of the cooling mold may be provided with a lining made of a nickel alloy or may be coated with a releasable agent.

Also, the support part is a member which supports the mouth part of the parison having a finish form and holds the parison in the cooling mold. Also, the cooling mold 20 shown in FIG. 11B has a structure provided with such a support part 21 in the finish die 26.

Figure 12A:
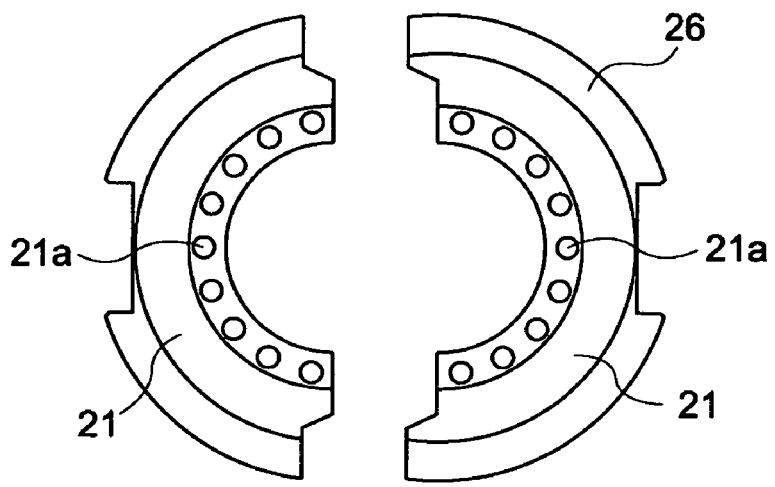
FIGS. 12A to 12C are views for explaining a support part of a cooling mold and a finish die.
Figure 12B:
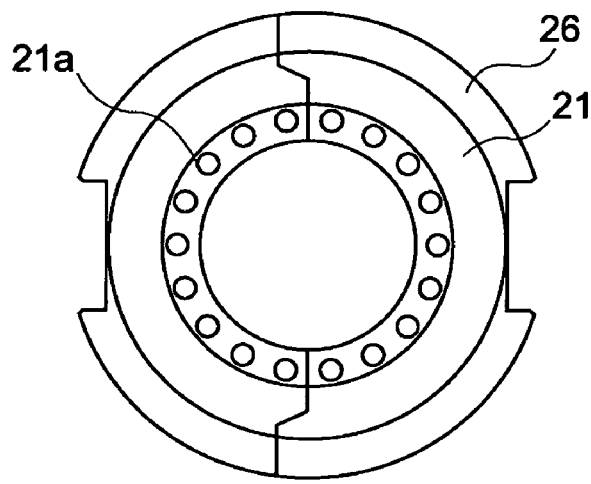
Figure 12C:
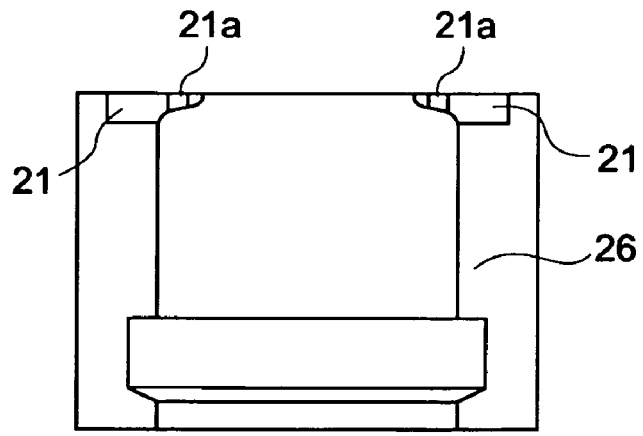

The finish die 26 provided with the support part 21 like this, as shown in FIG. 12, has a structure including two structural elements divided into two parts to sandwich the parison 50 having a finish form.

Also, the support part 21 is disposed in such a manner that the mouth ring parts 50a of the parison 50 having a finish form is supported by the support part 21 and a space is formed between the outside peripheral surface of the parison 50 and the finish die 26 so as to prevent the outside peripheral surface of the parison 50 from being in contact with the finish die 26.

This ensures that because the cooling mold is not brought into contact with any part other than the mouth ring part of the parison, a variation in the temperature of the glass vessel at the time of cooling.

Also, the support part 21 is disposed so as not to be in contact with the blow head 27 as shown in FIG. 11 (b) and is so structured as to discharge the first cooling air 41 efficiently.

Also, as shown in FIG. 12, it is preferable to provide a second cooling air discharge hole 21a.

This reason is that the second cooling air blown off from the underside can be forcibly passed through all spaces from the bottom part to mouth part of the parison in the space between the outside peripheral surface of the parison and the finish die, making it possible to cool the whole parison uniformly. Accordingly, the qualities of the glass vessel to be produced can be improved.

Also, because the above structure eliminates the necessity for carrying out internal processing of the finish die as the second cooling air discharge hole, the structure can be simplified and the production cost of the cooling mold can be therefore reduced.

Also, the bottom die 22 as the mounting part is a member on which the bottom part of the parison having a finish form is mounted, and the finish die is a member disposed at the position corresponding to the side surface of the parison having a finish form.

Figure 13A:
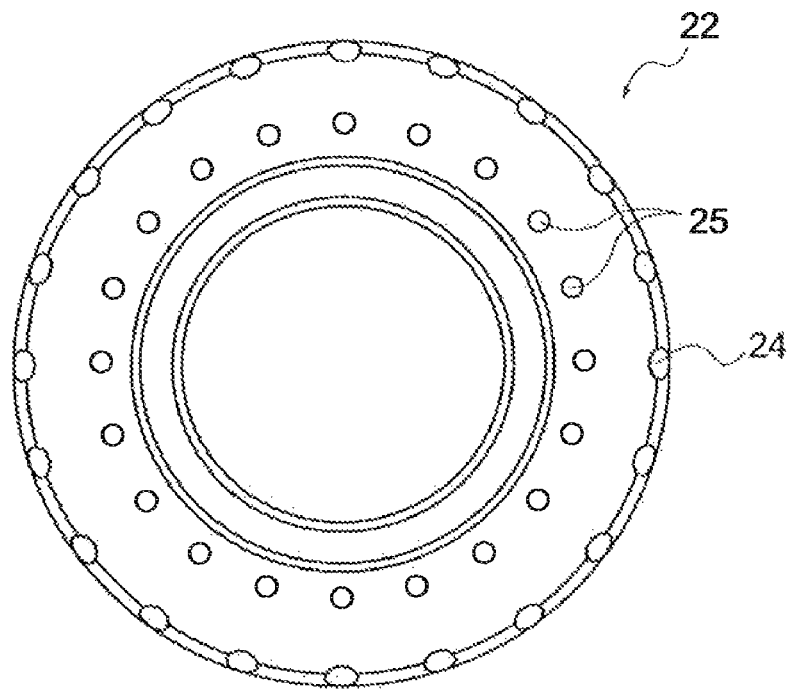
FIGS. 13A to 13B are views for explaining a bottom die as the mounting part of a cooling mold.
Figure 13B:
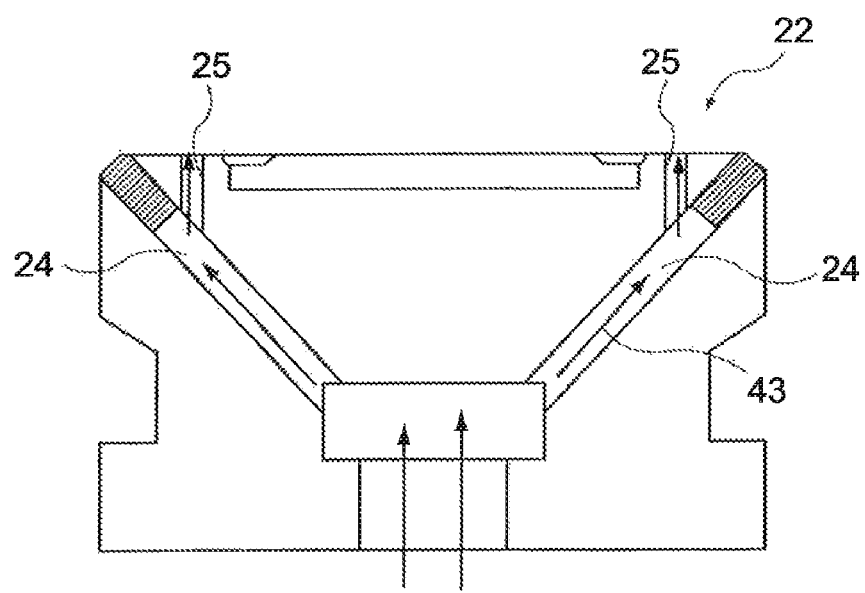

The bottom die 22, as shown in FIGS. 13A and 13B, includes a blow-off hole 24 that blows off the second cooling air 43 and a second discharge port 25 that blows off the second cooling air which is allowed to pass through the space formed between the outside peripheral surface of the parison having a finish form and the finish die, from under the parison without directly blowing off the air against the parison.

With the cooling mold provided with the support part and the mounting part (bottom die), the second cooling air can be blown off in the predetermined direction from the second discharge port from under the parison, and therefore, the air is not directly blown off against the parison having a finish form.

Therefore, the parison having a finish form can be prevented from being deformed by the wind pressure of the second cooling air.

Also, the second cooling air blown off from the second discharge port can be made to pass through the space between the parison and the finish die, which enables efficient and uniform cooling of the parison from the inside surface and the outside surface thereof.

Moreover, unnecessary irregularities are not formed on the surface of the glass vessel to be obtained irrespective of the surface conditions of the inside surface and temperature conditions of the finish die and therefore, the qualities of the glass vessel to be produced can be improved.

Also, the structure provided with the second discharge port for discharging the second cooling air in the bottom die on the lower side of the parison eliminates the necessity for providing the blow-off hole of supplying the second cooling air and also eliminates the necessity of controlling the misregistration between the blow-off holes of the bottom die and finish die. Therefore, the structure of the cooling mold can be significantly simplified and also the production cost of the cooling mold can be reduced.

Also, as shown in FIG. 13A, the second discharge port 25 disposed in the bottom die 22 as the mounting part is preferably provided in plural.

This reason is that the second cooling air can be supplied to the space between the outside peripheral surface of the parison and the finish die from plural places, enabling efficient cooling of the parison.

Also, when plural second discharge ports 25 are disposed, these second discharge ports 25 are preferably disposed along the periphery of the mounting part 22 at equal intervals.

This is because the second cooling air is allowed to pass through the outside peripheral surface of the parison having a finish form uniformly and therefore, the thickness and the like of the glass vessel to be produced can be uniformed to thereby improve the qualities of the glass vessel.

Also, the temperature of the cooling mold is preferably so designed that the surface temperature of the parison having a finish form is in a range from 500 to 800° C., though it may be determined in consideration of, for example, the cooling capability and outward appearance of the parison having a finish form or profitability.

This reason is that when the surface temperature of the parison having a finish form inside of the cooling mold is designed to fall in the above range, this limits a deterioration in outward appearance and reduces the number of surface irregularities caused when a parison having the maximum thick wall part having a thickness larger than a predetermined value can be molded by one press.

More specifically, when the temperature of the cooling mold is below 500° C., the parison is excessively cooled. As a result, there is a case where the parison is deteriorated in outward appearance and is increased in the number of surface irregularities, and further, the first and second cooling airs are excessively used, which is economically disadvantageous.

When the temperature of the cooling mold exceeds 800° C., on the other hand, the parison is insufficiently cooled. There is therefore the case where the parison is deteriorated in outward appearance and is increased in the number of surface irregularities, on the contrary.

Therefore, the temperature of the cooling mold is designed to be preferably in a range from 550 to 780° C. and more preferably in a range from 600 to 750° C.

3. Production Process
(1) Molding Step

Figure 14A:
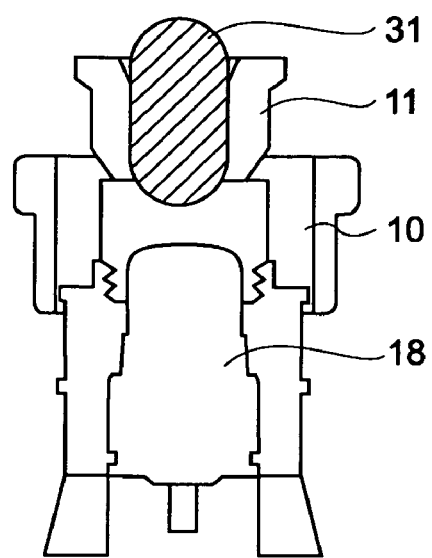
FIGS. 14A to 14C are views for explaining a step of molding a parison.

First, as shown in FIG. 14A, the forming die 10 is installed and a glass gob 31 is poured into the forming die 10 through a funnel 11.

Figure 14B:
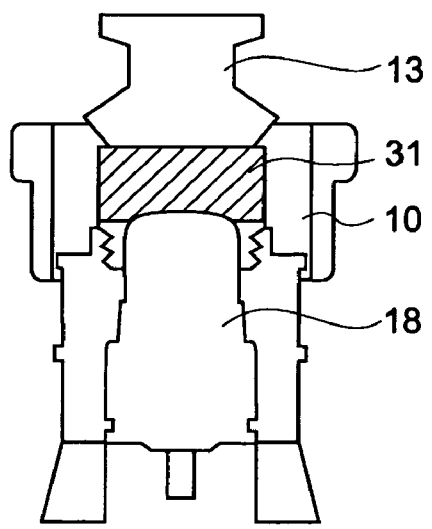
Figure 14C:
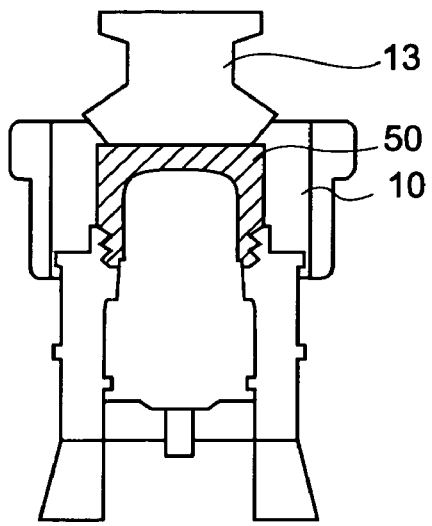

Then, as shown in FIGS. 14B and 14C, a baffle 13 is installed in place of the funnel 12 and then, a plunger 18 is inserted into the forming die 10 filled with the glass gob 31. Then, this situation is maintained till the surface of the parison 50 is cooled to the extent that it keeps a certain shape.

In such a molding step, a parison having a desired finish shape is formed.

(2) Transfer Step

Figure 15:
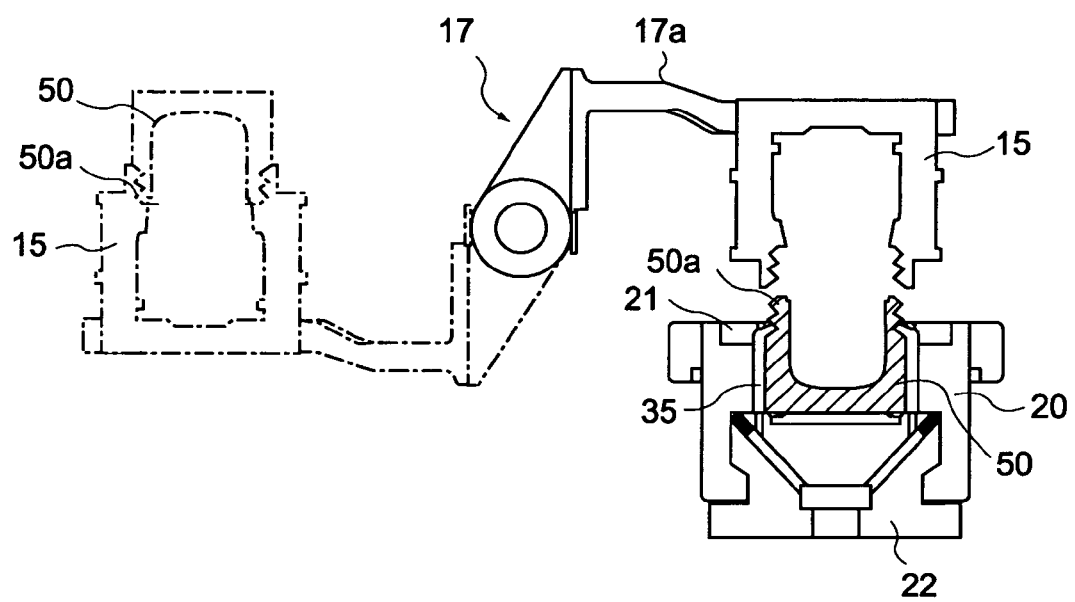
FIG. 15 is a view for explaining a step of transferring a parison.

Then, after the forming die and the plunger are pulled out as shown in FIG. 15, the parison 50 having a finish form is transferred by turning the parison at an angle of 180° by a swivel device 17 having an arm 17a to receive the parison in the cooling mold 20.

More specifically, the parison 50 having a finish form is transferred by turning it in the condition that its mouth ring part 50a is supported by the mouth die 15 which is connected to the arm 17a and is a part of the forming die 10 and is received and retained in the cooling mold 20.

Namely, the parison 50 having a finish form which is transferred to the vicinity of the cooling mold 20 is, at that time, dropped by its own weight such that its bottom is placed on the bottom die when the mouth die 15 is opened.

Next, the cooling mold 20 divided into at least two parts is moved from the side of the parison 50 having a finish form and then closed in the situation where a space 35 having a predetermined width is formed between the outside peripheral surface of the parison 50 having a finish form and the cooling mold 20 to enclose the periphery of the parison 50 having a finish form.

In this case, as shown in FIGS. 5 and 6, a guide member 16 is disposed inside of the mouth die 15 and set to the inside of mouth die 15 through a spring material 16a, and therefore, the guide member 16 is forcibly centered by the work of the spring material 16a even when the mouth die 15 is opened, thereby making it possible to mount the parison 50 having a finish form at a predetermined position with high accuracy.

(3) Cooling Step

Then, a cooling step of producing a glass vessel from the parison having a finish form by blowing off first cooling air along the inside peripheral surface of the parison having a finish form and by, at the same time, sending second cooling air that cools the outside peripheral surface of the parison having a finish form, along the outside peripheral surface of the parison having a finish form.

Figure 16A:
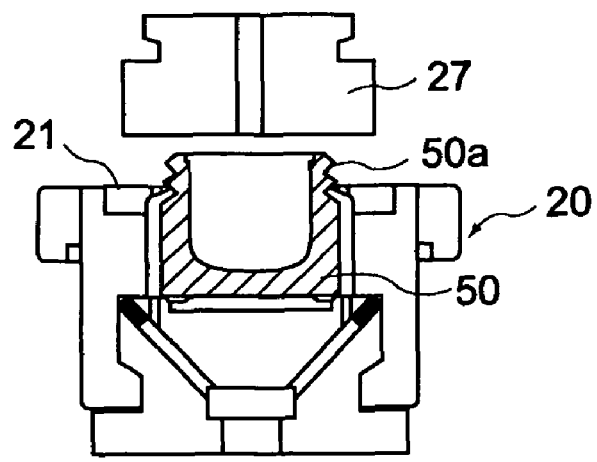
FIGS. 16A to 16C are views for explaining a step of cooling a parison.

Specifically, as shown in FIG. 16A, a blow head 27 is disposed above the cooling mold 20. At this time, the blow head 27 is disposed apart from the mouth ring part 50a of the parison 50 and the support part 21 that supports the mouth ring part 50a of the parison.

Figure 16B:
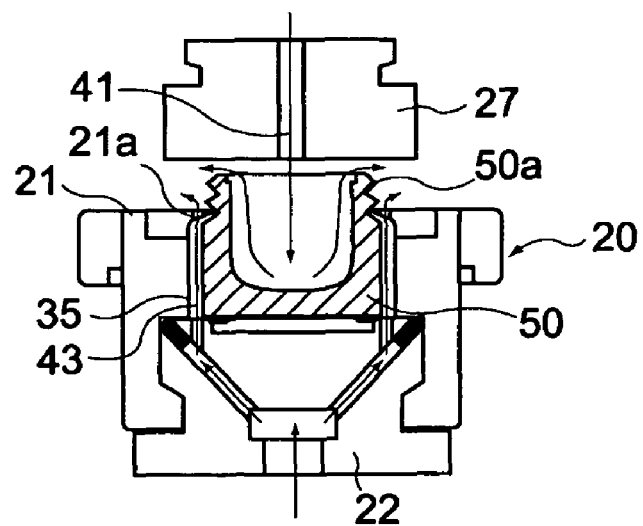

Then, as shown in FIG. 16B, the predetermined first cooling air 41 is blown off to the inside of the parison 50 having a finish form through the blow head 27 disposed above the cooling mold 20.

Then, at the same time, the predetermined second cooling air 43 is blown into the space 35 formed between the outside peripheral surface of the parison 50 and the cooling mold 20 from under the parison 50 without blowing off the air directly against the parison 50.

The parison 50 having a finish form can be thereby cooled from the outside peripheral surface and from the inside surface efficiently to obtain a finished glass vessel.

(3)-1 First Cooling Air

Then, the first cooling air 41 will be described in detail.

First, the first air having a temperature adjusted to 20 to 60° C. and a humidity adjusted to 80 to 100% is introduced from the blow head and supplied along the inside peripheral surface of the parison having a finish form.

In other words, when the temperature and relative humidity of the first cooling air are controlled in these ranges, the content of steam contained in the first cooling air can be limited to a value falling in a predetermined range.

For this, not only the parison in the cooling mold can be uniformly cooled, but also far-infrared rays emitted from the parison can also be absorbed efficiently by using the cooling air containing a predetermined amount of steam.

On the other hand, because the parison is also cooled by the second cooling air at the same time from the outside peripheral surface of the parison having a finish form, this second cooling air can reduce a deterioration in the outward appearance of the parison and the number of surface irregularities in cooperation with the first cooling air even in the case of molding a parison having the maximum thick wall part having a thickness larger than a predetermined value by one press and cooing the parison.

The temperature and relative humidity of the first cooling air are adjusted preferably to a temperature range from 35 to 50° C. and to a humidity range from 85 to 99% and more preferably to a temperature range from 38 to 50° C. and to a humidity range from 90 to 98% because a distribution of the content of steam can be narrowed with the result that the parison having a finish form can be cooled efficiently, uniformly and economically.

Here, the influence of each of the first and second cooling airs under the condition of a predetermined relative humidity on the inside and outside surface temperatures will be described with reference to FIGS. 17A and 17B.

Figure 17A:
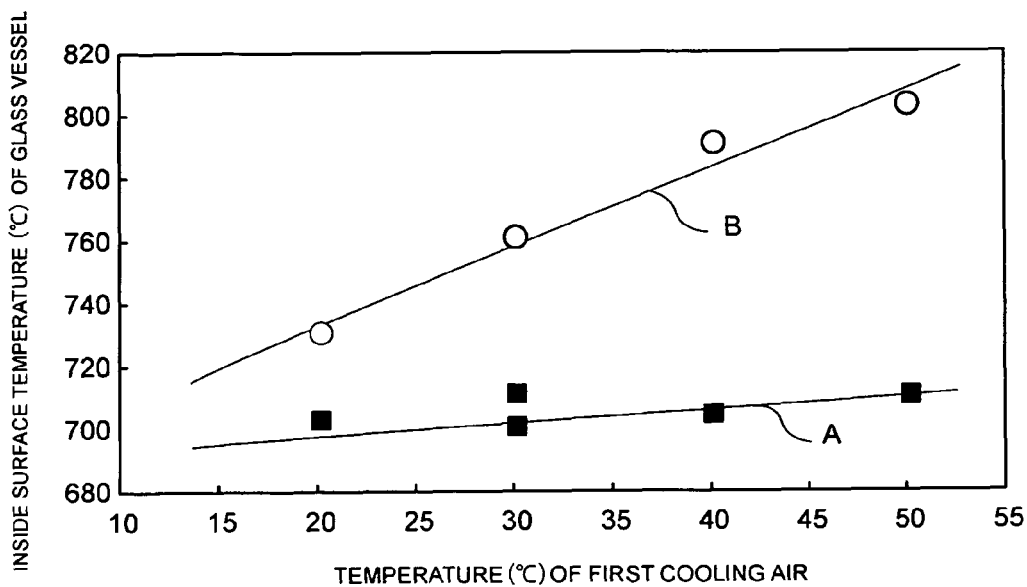
FIGS. 17A and 17B are views showing the influence of the temperature of cooling air under a prescribed relative humidity.

In FIG. 17A, the abscissa indicates the temperature (° C.) of the first cooling air and the ordinate is the temperature (° C.) of the inside surface of the glass vessel. Also, the line A shows a characteristic curve in the case where the relative humidity of the first cooling air is 80 to 100% Rh. On the other hand, the line B shows a characteristic curve in the case where the relative humidity of the first cooling air is below 80% Rh.

As is clear from the characteristic curves (lines A and B) shown in FIG. 17A, when the relative humidity of the first cooling air is 80 to 100% Rh, the temperature of the inside surface of the glass vessel is almost a constant temperature of about 700° C. though the temperature of the first cooling air is about 20 to 50° C. as shown by the line A.

When the relative humidity of the first cooling air is below 80% Rh, on the other hand, the temperature of the inside surface of the glass vessel is largely changed by the temperature (20 to 50° C.) of the first cooling air and that temperature is as high as at least 720° C. or more as shown by the line B.

Therefore, the relative humidity of the first cooling air is controlled to 80 to 100% Rh and the first cooling air having a predetermined temperature is used. This ensures that the temperature of the inside surface of the glass vessel can be exactly controlled in a predetermined range, that is, for example, in a range from 680 to 710° C.

Figure 17B:
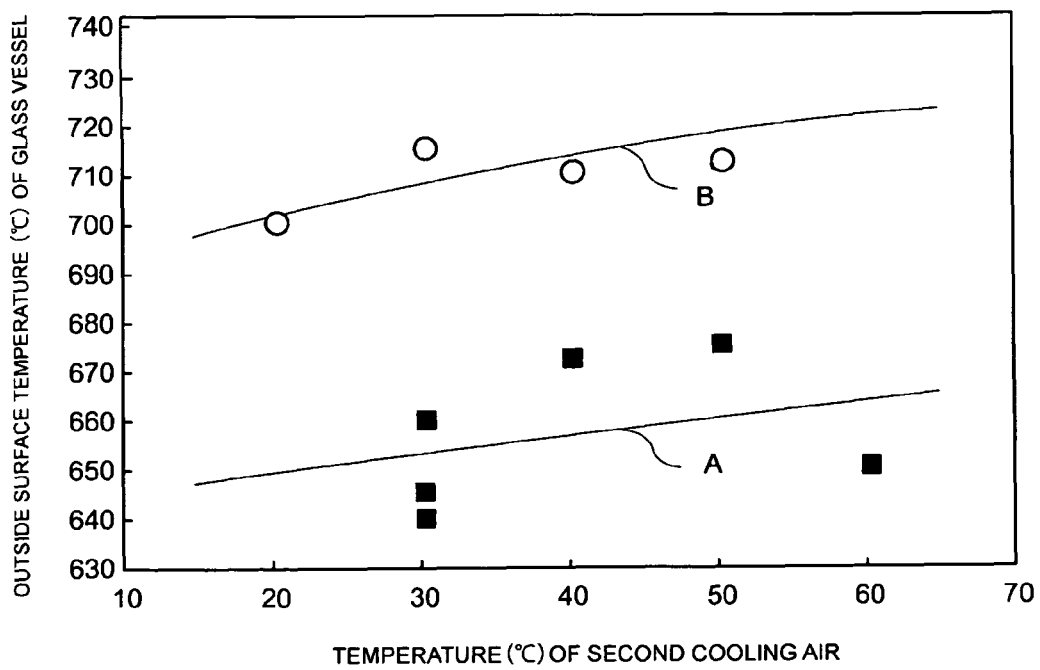

In FIG. 17B, the abscissa indicates the temperature (° C.) of the second cooling air and the ordinate indicates the temperature (° C.) of the outside surface of the glass vessel. Also, the line A shows a characteristic curve in the case where the relative humidity of the second cooling air is 80 to 100% Rh. On the other hand, the line B shows a characteristic curve in the case where the relative humidity of the second cooling air is below 80% Rh.

As is clear from the characteristic curves (lines A and B) shown in FIG. 17B, when the relative humidity of the second cooling air is 80 to 100% Rh, the temperature of the inside surface of the glass vessel is about 630 to 670° C. in spite of the temperature (30 to 50° C.) of the second cooling air as shown by the A.

When the relative humidity of the second cooling air is below 80% Rh, on the other hand, the temperature of the inside surface of the glass vessel is largely changed by the temperature of the second cooling air and that temperature is as high as at least 690° C. or more as shown by the line B.

Therefore, the relative humidity of the second cooling air is controlled to 80 to 100% Rh and the second cooling air having a predetermined temperature is used. This ensures that the temperature of the inside surface of the glass vessel can be exactly controlled in a predetermined range, that is, for example, in a range from 630 to 680° C.

Also, the influence of the relative humidity of the first cooling air under a predetermined temperature condition will be described with reference to FIG. 18.

Figure 18:
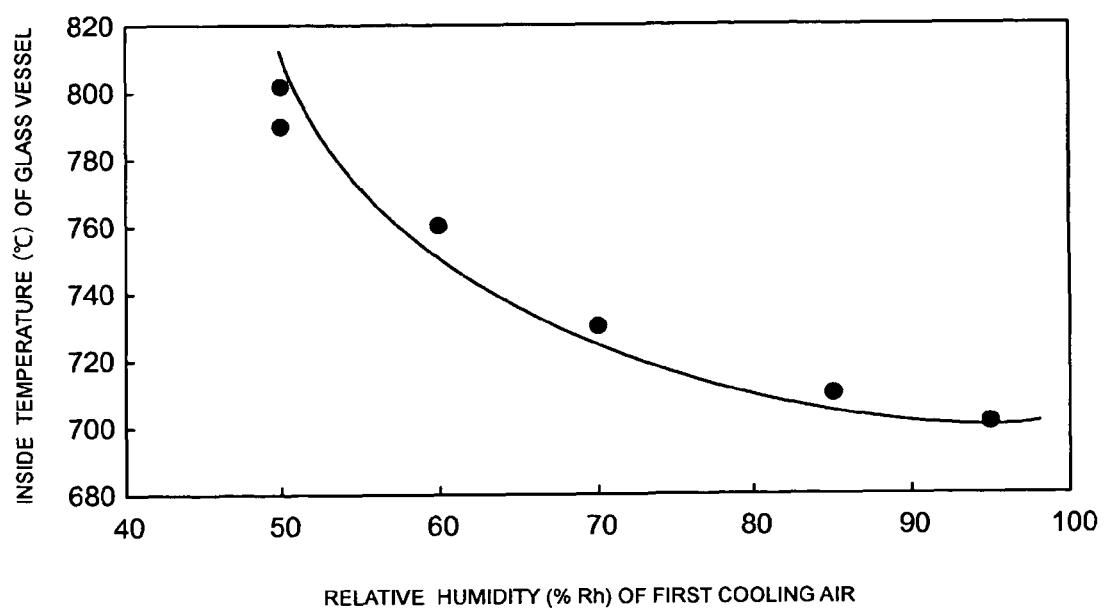
FIG. 18 is a view showing the influence of the relative humidity of a first cooling air under a predetermined temperature condition.

In FIG. 18, the abscissa indicates the relative humidity (% Rh) of the first cooling air and the ordinate indicates the temperature (° C.) of the inside surface of the glass vessel.

Then, as shown in FIG. 18, it may be the that when the relative humidity of the first cooling air is below 80% Rh, the temperature of the inside surface of the glass vessel is largely changed with variation in relative humidity. For example, when the relative humidity of the first cooling air is 50% Rh, the temperature of the inside surface of the glass vessel is about 800° C. and even when the relative humidity is 70% Rh, the temperature of the inside surface of the glass vessel is about 730° C.

When the relative humidity of the first cooling air exceeds 80% Rh, on the other hand, a variation in the temperature of the inside surface as a function of a variation in relative humidity is remarkably decreased. For example, when the relative humidity of the first cooling air is 80% Rh, the temperature of the inside surface of the glass vessel is about 720° C., when the relative humidity of the first cooling air is 90% Rh, the temperature of the inside surface of the glass vessel is about 710° C. and when the relative humidity of the first cooling air is 100% Rh, the temperature of the inside surface of the glass vessel is about 700° C.

Therefore, the relative humidity of the first cooling air is controlled to 80 to 100% Rh and the first cooling air having a predetermined temperature (20 to 50° C.) is used. This ensures that the temperature of the inside surface of the glass vessel can be exactly controlled in a predetermined range, that is, for example, in a range from 700 to 720° C.

Also, as to the control of the cooling air, a difference between the highest temperature and the lowest temperature is preferably designed to be within 15° C.

This reason is that when such a temperature difference exceeds 15° C., a variation in the content of steam is increased and a variation in temperature after the cooling air is distributed from the manifold is more increased, so that there is a case where the shape of the glass vessel to be obtained is non-uniformed.

Therefore, a difference between the highest temperature and lowest temperature of the injection temperature of the cooling air is designed to be preferably within 12° C. and more preferably 10° C.

Also, the content of steam contained in the first cooling air is preferably in a range from 15 to 130 $g/m^3$.

This reason is that because the amount of steam to be contained in the first cooling air is limited to the predetermined range, a deterioration in outward appearance and the number of surface irregularities caused when a parison having the maximum thick wall part having a thickness larger than a predetermined value is molded by one press can be more reduced.

More specifically, when the content of steam contained in the first cooling air is below 15 $g/m^3$, the outside peripheral surface of the parison having the maximum thick wall part having a thickness larger than a predetermined value is insufficiently cooled. When the content of steam contained in the first cooling air exceeds 130 $g/m^3$ on the other hand, there is the case where the content out of the above range is economically disadvantageous.

Therefore, the content of steam contained in the first cooling air is designed to be preferably in a range from 20 to 100 $g/m^3$ and more preferably in a range from 30 to 80 $g/m^3$.

Also, it is preferable that the temperature of the first cooling air be raised once to a predetermined temperature and then dropped to adjust it to a temperature range from 20 to 60° C.

This reason is that if the temperature of the first cooling air is adjusted in this manner, the relative humidity of the first cooling air can be exactly adjusted to a value falling in a predetermined range even in the case of using the open air having a low relative humidity.

Therefore, the temperature of the first cooling air is preferably raised to 50 to 100° C. and then dropped to adjust it to a temperature range from 20 to 60° C. and is more preferably raised to 60 to 90° C. and then dropped to adjust it to a temperature range from 20 to 60° C.

Also, the injection time of the first cooling air is preferably designed to be in a range from 1 to 10 seconds.

This reason is that the parison having the maximum thick wall part having a thickness larger than a predetermined value can be sufficiently cooled and also, production yield can be raised by limiting the injection time of the first cooling air in this manner.

More specifically, when the injection time of the first cooling air is below one second, there is the case where the parison having the maximum thick wall part having a thickness larger than a predetermined value is insufficiently cooled. In contrast, when the injection time of the first cooling air exceeds 10 seconds, there is the case where this is economically disadvantageous.

Therefore, the injection time of the first cooling air is designed to be preferably in a range from 2 to 8 seconds and more preferably in a range from 3 to 6 seconds.

Also, the injection speed of the first cooling air is preferably designed to be in a range from 1 to 50 litter/sec.

This reason is that the parison having the maximum thick wall part having a thickness larger than a predetermined value can be sufficiently cooled and the parison can be decreased in the deterioration of outward appearance and in the number of surface irregularities which are caused by the cooling can be more decreased by limiting the injection speed of the first cooling air in this manner.

More specifically, when the injection speed of the first cooling air is below 1 litter/sec, there is the case where the parison having the maximum thick wall part having a thickness larger than a predetermined value is insufficiently cooled. In contrast, when the injection speed of the first cooling air exceeds 50 litter/sec, there is the case where this is economically disadvantageous.

Therefore, the injection speed of the first cooling air is designed to be preferably in a range from 5 to 30 litter/sec and more preferably in a range from 10 to 25 litter/sec.

Figure 19:
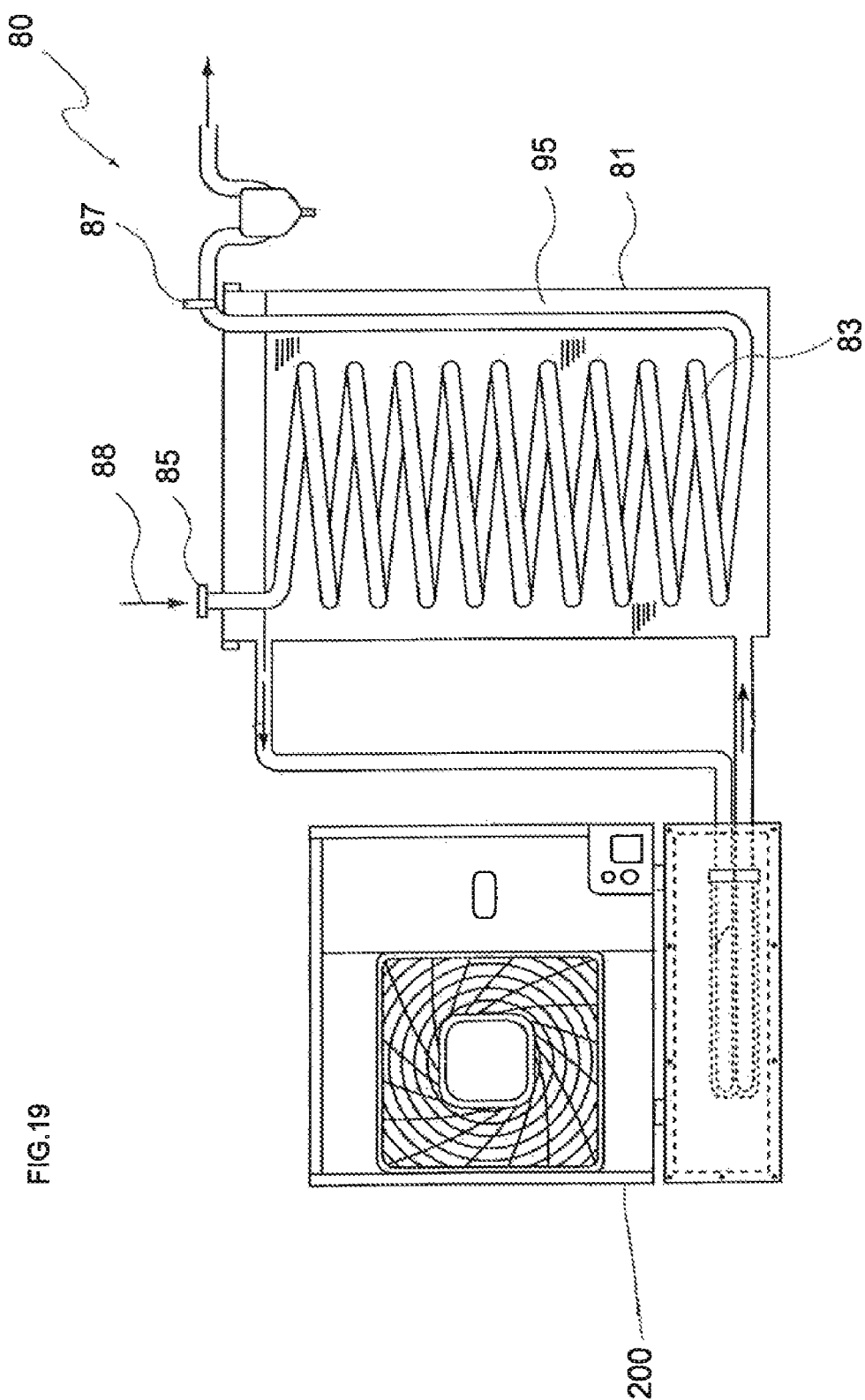
FIG. 19 is a view for explaining a heat exchanger.

Also, it is preferable that a heat exchanger as shown in FIG. 19, that is, a heat exchanger 80 include an air intake port 85, an air passage 83 and a cooling air discharge port 87, and a cooling section 81 which uses a cooling medium 95 and is disposed around the air passage 83 to thereby adjust the temperature and relative humidity of the first cooling air.

This is because an air 88 sucked from the air intake port 85 is cooled by the cooling medium 95 of the cooling section 81 disposed around the air passage 83 while the air 88 passes through the air passage 83 and discharged from the air discharge port 87, and this structure makes it possible to obtain the first cooling air having a predetermined temperature and a predetermined relative humidity efficiently at low costs.

Also, it may be so structured that the air introduced from the air intake port 85 is positioned against the cooling section 81 and therefore, the air can be cooled more efficiently.

Particularly, even in the case of taking the open air in the air intake port as it is, the first cooling air having a predetermined temperature and a predetermined relative humidity can be obtained efficiently, showing that this heat exchanger is suitable.

Here, the cooling medium used for the heat exchanger is preferably water. This reason is that when water is used as the cooling medium, air can be cooled efficiently and also, air can be cooled economically.

At this time, the water is preferably mixed with ice according to the need. This reason is that when the temperature of the open air is high, the temperature of the water is raised and there is the case where the effect of cooling air is reduced. Accordingly, the elevation of the temperature of water can be prevented by mixing ice.

Also, it is preferable to cool by using a cooling apparatus (called a second cooler in some cases) further installed outside of the heat exchanger while circulating water as the cooling medium. As a preferable example of the heat exchanger, a second cooler 200 is further installed as a part of the heat exchanger 80 as shown in FIG. 19.

This reason is that the temperature of the cooling air and the amount of saturated steam can be controlled easily by installing the second cooler in this manner to control the temperature of the cooling medium (water) in the heat exchanger.

Specifically, in the environment where a glass vessel production apparatus is disposed, there is the case where the temperature and relative humidity of the atmosphere are, for example, 30° C. and 80% Rh in summer. In this case, the temperature of the cooling air can be controlled to lower than the dew point (for example, 26° C.) by the second cooler 200.

For this, even in summer or winter, water exceeding the amount of saturated steam is condensed and the generated condensed water is discharged from a drain whereas only steam in an amount equal or close to the amount of saturated steam remains in the cooling air.

Therefore, the glass vessel can be efficiently prevented from being broken by condensed water contained in the cooling air.

Also, the cooling air only containing a predetermined amount of steam can be used, the cooling effect can be significantly improved and therefore, the glass vessel production efficiency can be outstandingly improved.

Moreover, since the cooling air fundamentally only containing steam is used, it has been clarified that the glass vessel to be obtained is also improved in surface smoothness.

Incidentally, though no particular limitation is imposed on the structure of the second cooler 200, it preferably includes, for example, a compressor, condenser, vaporizer and circulating apparatus for the cooling medium.

(3)-2 Second Cooling Air

Then, the second cooling air will be described in detail.

In the case of the bottom die 22 having the structure shown in FIG. 13B, the second cooling air 43 is not blown off intensively against a specified position of the parison 50.

Accordingly, the parison 50 having a finish form is not deformed by the second cooling air 43 and therefore, the glass vessel can be significantly improved in qualities.

Also, in order to blow off the second cooling air without directly blowing off the air against the parison, it is preferable to blow off the second cooling air 43 along the outside peripheral surface of the parison 50 as shown in FIG. 16(b).

This prevents the parison from being deformed by the second cooling air rebounded from the inside surface of the cooling mold. Therefore, the finish shape of the parison can be maintained more exactly.

Also, the second cooling air 43 which is allowed to pass through the space 35 from under the parison is preferably discharged from the discharge hole 21a disposed on the support part 21 in the vicinity of the mouth ring part 50a of the upper side parison 50.

This prevents deterioration in the qualities of the glass vessel caused by uneven temperature difference because the entire outside peripheral surface of the parison 50 can be cooled by using the second cooling air 43.

With regard to the first cooling air 41 blown through the blow head 27, the air can be efficiently discharged because a space is formed between the blow head 27 and the support part 21. Therefore, the parison 50 having a finish form is free from the deformation of the inside shape thereof.

In the meantime, when the pressures of the second and first cooling airs are excessively large or are unbalanced with each other, there is the case where the parison is deformed by wind pressure.

In light of this, as to the desirable pressure of the cooling air which is, changed depending on the type of glass vessel to be produced. However, it is preferable that, for example, the pressure of the second cooling air be in a range from 0.05 to 0.20 MPa and the pressure of the first cooling air be in a range from 0.05 to 0.20 MPa in the case of producing a relatively small glass vessel to be used for cosmetics.

Also, it is preferable that the temperature of the second cooling air to be adjusted to a value range from 20 to 80° C. and the relative humidity of the second cooling air be adjusted to a value range from 50 to 100%.

This reason is that when the temperature of the second cooling air is limited to a value falling in the predetermined range, this can more reduce a deterioration in the outward appearance of the parison and the number of surface irregularities in the case of molding the parison having the maximum thick wall part having a thickness larger than a predetermined value by one press and cooing the parison.

With regard also to the second cooling air, the temperature of the second cooling air is raised once to a predetermined temperature and then dropped to adjust it to a temperature range from 20 to 80° C., thereby making it possible to exactly adjust the relative humidity to a value falling in a predetermined range even in the case of using the open air having a low relative humidity in winter.

Also, the content of steam contained in the second cooling air is preferably in a range from 10 to 130 $g/m^3$.

This reason is that when the content of the steam contained in the second cooling air is limited to a value falling in the predetermined range, this can more reduce a deterioration in the outward appearance of the parison and the number of surface irregularities in the case of molding the parison having the maximum thick wall part having a thickness larger than a predetermined value by one press and cooing the parison.

More specifically, when the content of steam contained in the second cooling air is below 10 $g/m^3$, the outside peripheral surface of the parison having the maximum thick wall part having a thickness larger than a predetermined value is insufficiently cooled. When the content of steam contained in the second cooling air exceeds 130 $g/m^3$, on the other hand, there is the case where this is economically disadvantageous.

Accordingly, the content of steam contained in the second cooling air designed to be preferably in a range from 15 to 100 $g/m^3$, and more preferably in a range from 30 to 80 $g/m^3$.

With regard also to the second cooling air, similarly to the case of the first cooling air, the temperature of the second cooling air be raised once to a predetermined temperature and then dropped to adjust it to a temperature range from 20 to 60° C., thereby making it possible to exactly adjust the relative humidity to a value falling in a predetermined range even in the case of using the open air having a low relative humidity in the winter season.

Also, the injection time of the second cooling air is preferably designed to be in a range from 1 to 10 sec.

This reason is that when the injection time of the second cooling air is limited in this manner, the parison having the maximum thick wall part having a thickness larger than a predetermined value can be cooled sufficiently and production yield can be improved.

More specifically, when the injection time of the second cooling air is below one second, there is the case where the parison having the maximum thick wall part having a thickness larger than a predetermined value is insufficiently cooled. When the injection time of the second cooling air exceeds 10 seconds on the contrary, there is the case where this is economically disadvantageous.

Therefore, the injection time of the second cooling air is designed to be preferably in a range from 2 to 8 seconds and more preferably in a range from 3 to 6 seconds.

In this case, the injection time of the second cooling air is preferably the same as that of the first cooling air.

Also, the injection speed of the second cooling air is preferably designed to be in a range from 1 to 50 litter/sec.

This reason is that the parison having the maximum thick wall part having a thickness larger than a predetermined value can be sufficiently cooled and the parison can be decreased in the deterioration of outward appearance and in the number of surface irregularities which are caused when cooled by limiting the injection speed of the second cooling air in this manner.

More specifically, when the injection speed of the second cooling air is below 1 litter/sec, there is the case where the parison having the maximum thick wall part having a thickness larger than a predetermined value is insufficiently cooled. In contrast, when the injection speed of the second cooling air exceeds 50 litter/sec, there is the case where this is economically disadvantageous.

Therefore, the injection speed of the second cooling air is designed to be preferably in a range from 2 to 30 litter/sec and more preferably in a range from 3 to 20 litter/sec.

(4) Mold Releasing Step

Figure 16C:
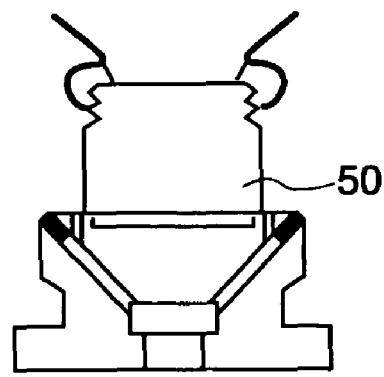

Then, as shown in FIG. 16C, the cooled glass vessel 50 is taken out by dismounting the cooling mold and the blow head.

Then, the glass vessel 50 taken out of the cooling mold 20 is preferably cooled on a dead plate 57 shown in FIG. 3.

This reason is that the glass vessel can be cooled efficiently by cooling the glass vessel gradually from the outside surface of the glass vessel on the dead plate.

Accordingly, the glass vessel 50 dropped to a predetermined temperature is then introduced into a slow-cooling apparatus (not shown) by a conveyer 59 shown in FIG. 3 and is cooled to a temperature close to ambient temperature in the slow-cooling apparatus.

Also, the periphery of the dead plate, and particularly, the underside is preferably cooled by using the cooling air introduced from the cooler.

This reason is that such a structure enables the dead plate to be also forcibly cooled by the cooling air introduced from the cooler, so that the whole glass vessel can be efficiently cooled at low costs.

Accordingly, it is preferable to further install a cooling air pipe extending from a manifold which will be described below to the dead plate.

Because it is necessary that the dead plate be superior in heat resistance and radiation ability, the dead plate is preferably constituted as a plane plate of 5 to 7 mm in thickness by using a material such as carbon.

The glass vessel is introduced into the slow-cooling apparatus while it is cooled on the dead plate and cooled to a temperature close to ambient temperature in the slow-cooling apparatus.

EXAMPLES

Example 1

1. Production of a Glass Vessel

Glass vessels which were made of soda lime glass and had the outward appearance shown in FIG. 2C were produced using a mold shown in FIG. 1 by a one-press apparatus for manufacturing a glass vessel shown in FIG. 3. The number of the glass vessels is 20000.

Figure 20:
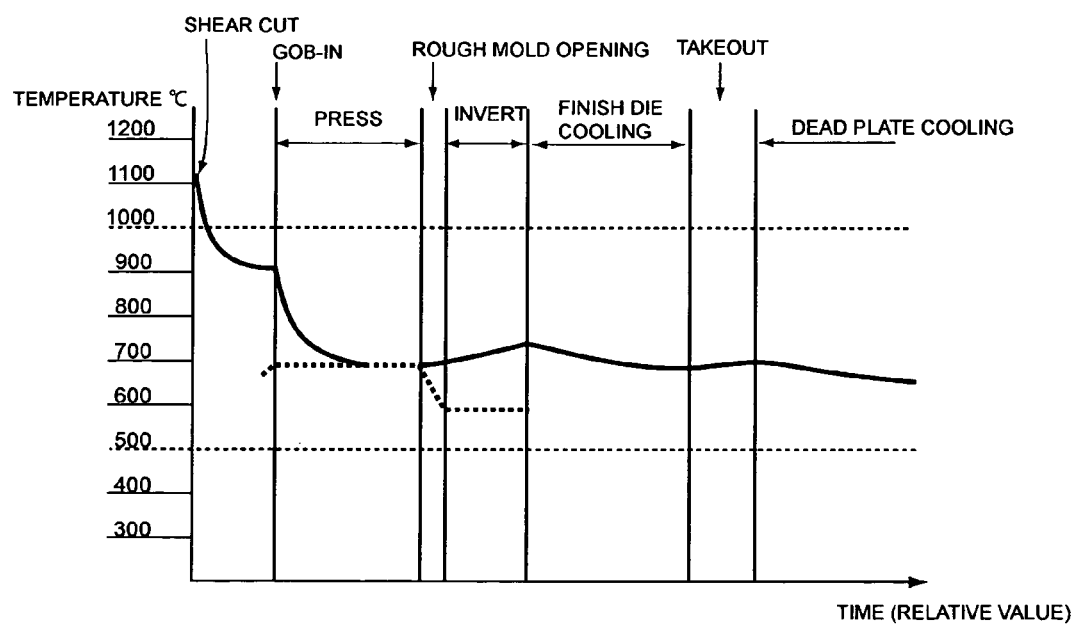
FIG. 20 is a view showing a temperature profile in a one-press method for producing a glass vessel.

At this time, the temperature profiles of the glass vessel, mold and the like are shown in FIG. 20.

Specifically, this profile shows that glass temperature when the gob was shear-cut was about 1100° C., the temperature when the gob was introduced (gob-in) into the forming mold was about 900° C. and the temperature of the forming mold when the parison was molded was dropped to from 700° C. to 900° C. during molding.

Then, this profile also shows that the temperature of the mold was about 700° C. when the forming mold (rough mold opening) was opened, and though the temperature of the parison was slightly raised from 700 to 750° C. when the parison was inverted to the cooling mold, the temperature of the cooling mold was dropped from 750 to 680° C. when the parison was cooled in the cooling mold.

Then, the profile further shows that the temperature of the glass vessel was slightly raised again from about 680 to 730° C. when the glass vessel was taken out (takeout) and the glass vessel was gradually cooled on the dead plate.

Also, the one-press apparatus for manufacturing a glass vessel shown in FIG. 3 includes a heat exchanger shown in FIG. 19 to produce saturated steam-containing cooling air (moist air) in which the temperature and relative humidity were adjusted to the following values by the heat exchanger.

Then, the produced cooling air was introduced into the manifold through a cooling pipe and then, used as first cooling air and second cooling air in the following condition: injection time is 1.5 sec and injection speed is 10 litter/sec.

First cooling air
Temperature: 30° C.
Relative humidity: 100% Rh
Second cooling air
Temperature: 30° C.
Relative humidity: 100% Rh

2. Evaluation of the Glass Vessel (1) Outward Appearance

Whether a glass vessel having the outward appearance (inside surface and outside surface) of the glass vessel shown in FIG. 2C was produced was determined by visual observation to measure the number of accepted products determined by the outward appearance of the inside surface and the number of accepted products determined by the outward appearance of the outside surface among 20000 glass vessels, that is, each yield, thereby evaluating the outward appearance according to the following standard.

Very Good The yield as to the outward appearance was 99% or more.
Good: The yield as to the outward appearance was 90% or more.
Fair: The yield as to the outward appearance was, 80% or more.
Bad: The yield as to the outward appearance was below 80%.

(2) Evaluation of Dimensions

The shoulder length (t1) of the glass vessel shown in FIG. 1 was measured to calculate the average and standard deviation.

Specifically, optional ten glass vessels were sampled from 20000 glass vessels.

Then, each shoulder length (t1) at a total of four measuring points (p1 to p4) in each glass vessel was measured by using a depth caliper (depth type caliper).

Figure 21A:
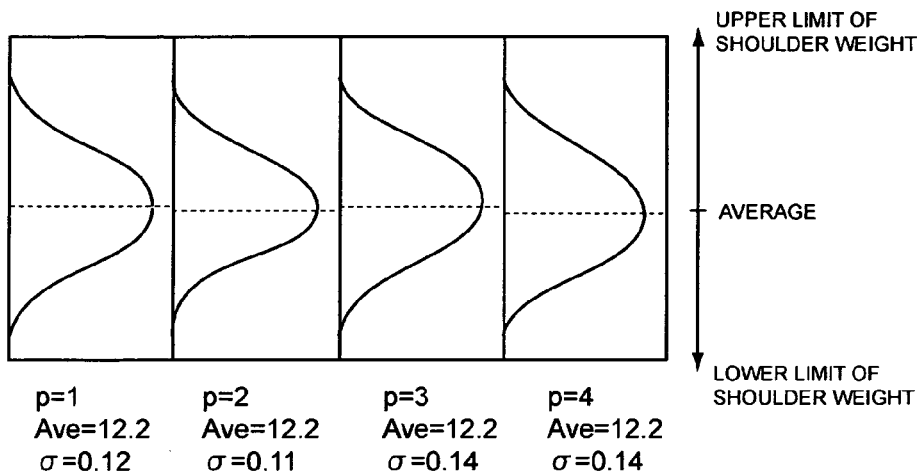
FIGS. 21A and 21B are views showing the results of measurement of shoulder height in Example 1 and Comparative Example 1.
Figure 21B:
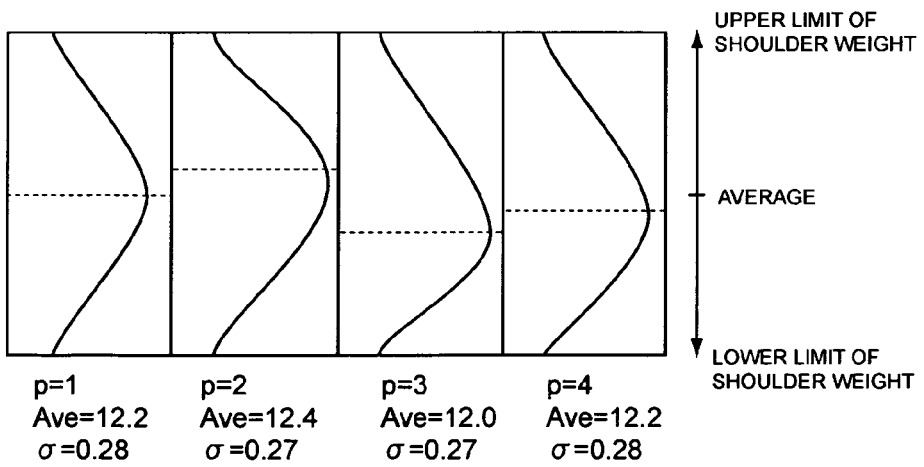

The results of measurement at these measuring points (p1 to p4) are shown in Table 1 and FIG. 21.

Comparative Example 1

In Comparative Example 1, a parison having a finish form was manufactured in the same manner as in Example 1 except that a forming mold in which the parting line is positioned at the shoulder part between the mouth ring part and the body of the parison having a finish form shown in FIG. 23 in place of the mold shown in FIG. 1 and also, the temperature and relative humidity of the first cooling air and the temperature and relative humidity of the second cooling air were altered as shown in Table 1, and the resulting parison was evaluated. The obtained results are shown in Table 1 and FIG. 21.

Another comparative example was also separately performed and evaluated in the case where the same condition as in Example 1 was used as the condition of the cooling air except that the conventional mold shown in FIG. 23 was used.

As a result, it was confirmed that the dimensional variation cannot be reduced at all and therefore, the outward characteristics of the outward surface of the glass vessel was still insufficient, though the outward characteristics of the inside surface of the glass vessel was slightly improved.

Examples 2 to 5

In each of these Examples 2 to 5, 20000 glass vessels were produced by one press production method in the same manner as in Example 1 except that the temperature and relative humidity of the first cooling air and the temperature and relative humidity of the second cooling air were altered as shown in Table 1. The obtained results are shown in Table 1.

TABLE 1

| | First cooling air | | Second cooling air | | Evaluation of outward appearance | | Dimensional evaluation | | | | | | | |
|---|---|---|---|---|---|---|---|---|---|---|---|---|---|---|
| | | | | | | | p = 1 | | p = 2 | | p = 3 | | p = 4 | |
| | Temp. (°C.) | Relative humidity (% Rh) | Temp. (°C.) | Relative humidity (% Rh) | Inside surface | Outside surface | Ave | σ | Ave | σ | Ave | σ | Ave | σ |
| Example 1 | 30 | 100 | 30 | 100 | Very Good | Very Good | 12.2 | 0.12 | 12.2 | 0.11 | 12.2 | 0.14 | 12.2 | 0.14 |
| Example 2 | 40 | 100 | 40 | 100 | Very Good | Very Good | 12.2 | 0.12 | 12.2 | 0.11 | 12.2 | 0.14 | 12.2 | 0.13 |
| Example 3 | 50 | 100 | 50 | 100 | Good | Very Good | 12.2 | 0.12 | 12.2 | 0.12 | 12.2 | 0.14 | 12.2 | 0.14 |
| Example 4 | 20 | 95 | 30 | 95 | Good | Good | 12.2 | 0.12 | 12.2 | 0.12 | 12.2 | 0.14 | 12.2 | 0.14 |
| Example 5 | 30 | 85 | 30 | 85 | Fair | Good | 12.2 | 0.13 | 12.2 | 0.13 | 12.3 | 0.15 | 12.3 | 0.15 |

TABLE 1-continued

| | First cooling air | | Second cooling air | | Evaluation of outward appearance | | Dimensional evaluation | | | | | | | |
|---|---|---|---|---|---|---|---|---|---|---|---|---|---|---|
| | | | | | | | p = 1 | | p = 2 | | p = 3 | | p = 4 | |
| | Temp. | Relative humidity | Temp. | Relative humidity | Inside | Outside | | | | | | | | |
| | (°C.) | (% Rh) | (°C.) | (% Rh) | surface | surface | Ave | σ | Ave | σ | Ave | σ | Ave | σ |
| Comparative Example 1 | 20 | 70 | 20 | 100 | Bad | Good | 12.2 | 0.28 | 12.4 | 0.27 | 12.0 | 0.27 | 12.2 | 0.28 |

INDUSTRIAL APPLICABILITY

In the one-press method for producing a glass vessel according to the present invention, a divided type forming die having a specific parting line is used. Therefore, even a parison having the maximum thick wall part having a thickness larger than a predetermined value can be efficiently molded by cooling. As a result, a glass vessel having a good appearance can be stably produced.

Specifically, the one-press method for producing a glass vessel according to the present invention can be decreased, for example, in the thermal damages of the mold and can also efficiently prevent deteriorations in the outward appearance of the parison having the maximum thick wall part having a thickness larger than a predetermined value and in the generation of surface irregularities.

What is claimed is:

1. A one-press method for producing a glass vessel, the method comprising:
   (A) a press step of molding, by one press, a parison which is provided with a body part, a mouth ring part and a shoulder part between the body part and the mouth ring part and has a finish form by pouring a gob into a forming die used to mold the parison having a finish form from the gob by using a forming die including a forming die base part and a mouth die which are each divided into two parts by a predetermined parting line and then by inserting a plunger into the forming die, wherein the shape of the finish form of the parison is substantially the same as the shape of a finish form of a glass vessel which is formed by cooling the parison to a predetermined temperature in a cooling mold;
   (B) a transfer step of transferring the parison having the finish form by turning it to the cooling mold provided with a support section which supports the mouth ring part of the parison having the finish form, a mounting section on which the bottom part of the parison having the finish form is mounted and a blow head which internally cools the parison having the finish form in the condition that the parison is grasped by the mouth die; and
   (C) a cooling step of forming the parison having flail the finish form into the glass vessel by blowing off a first cooling air along the inside peripheral surface of the parison having the finish form from the blow head and supplying a second cooling air that cools the outside peripheral surface of the parison having the finish form, along the outside peripheral surface of the parison having the finish form from a discharge port disposed in the mounting section, wherein
   the press step (A) is carried out using the forming die having a parting line positioned at the shoulder part between the mouth ring part and body part of the parison having the finish form and the parting line is located adjacent to the mouth ring part of the parison having the finish form; and
   a guide member is disposed inside of the mouth die through a spring member.

2. The one-press method for producing a glass vessel according to claim 1, wherein the inside surface of the forming die base part is a vertical plane or a slant plane having no projecting part.

3. The one-press method for producing a glass vessel according to claim 1, wherein the mouth die is divided into two parts and a mouth die aligning member is disposed in contact with the parting line.

4. The one-press method for producing a glass vessel according to claim 1, wherein the parison having the finish form has a maximum thick wall part which is designed to be in a range of from 0.8 to 5 cm in thickness.

5. The one-press method for producing a glass vessel according to claim 1, wherein an amount of steam to be contained in the first cooling air is designed to be in a range from 15 to 130 g/m$^3$.

6. The one-press method for producing a glass vessel according to claim 1, wherein the temperature and the relative humidity of the first cooling air is controlled by a heat exchanger including an air intake port, an air passage, a cooling air discharge port and a cooling part using a cooling medium around the air passage.

7. A one-press method for producing a glass vessel, the method comprising:
   (A) a press step of molding, by one press, a parison which is provided with a body part, a mouth ring part and a shoulder part between the body part and the mouth ring part and has a finish form by pouring a gob into a forming die used to mold the parison having a finish form from the gob by using a forming die including a forming die base part and a mouth die which are each divided into two parts by a predetermined parting line and then by inserting a plunger into the forming die;
   (B) a transfer step of transferring the parison having a finish form to a cooling mold provided with a support section which supports the mouth ring part of the parison having the finish form, a mounting section on which the bottom part of the parison having the finish form is mounted and a blow head which internally cools the parison having the finish form in the condition that the parison is grasped by the mouth die; and
   (C) a cooling step of forming the parison having the finish form into the glass vessel by blowing off a first cooling air along the inside peripheral surface of the parison having the finish form from the blow head and supplying a second cooling air that cools the outside peripheral surface of the parison having the finish form, along the outside peripheral surface of the parison having the finish form from a discharge port disposed in the mounting section, wherein at least the sides of the cooling mold are not in contact with the parison having the finish form, and wherein the press step (A) is carried out using the forming die having a parting line positioned at the shoulder part between the mouth ring part and body part of the parison having the finish form.

* * * * *